(12) United States Patent
Miyazaki et al.

(10) Patent No.: US 7,571,351 B2
(45) Date of Patent: Aug. 4, 2009

(54) METHOD FOR CONTROLLING A POLICY

(75) Inventors: Daisuke Miyazaki, Ebina (JP); Shuji Fujino, Ayase (JP); Takashi Abe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 491 days.

(21) Appl. No.: 11/354,116

(22) Filed: Feb. 15, 2006

(65) Prior Publication Data

US 2007/0174708 A1   Jul. 26, 2007

(30) Foreign Application Priority Data

Nov. 28, 2005   (JP) .............................. 2005-341579

(51) Int. Cl.
*G06F 11/00* (2006.01)

(52) U.S. Cl. ....................................................... 714/25

(58) Field of Classification Search ........................ None
See application file for complete search history.

(56) References Cited

U.S. PATENT DOCUMENTS

| | | | | |
|---|---|---|---|---|
| 5,463,768 | A * | 10/1995 | Cuddihy et al. | 714/37 |
| 5,922,079 | A * | 7/1999 | Booth et al. | 714/26 |
| 5,983,364 | A * | 11/1999 | Bortcosh et al. | 714/25 |
| 6,473,659 | B1 * | 10/2002 | Shah et al. | 700/79 |
| 2003/0167111 | A1 * | 9/2003 | Kipersztok et al. | 701/29 |
| 2004/0073844 | A1 * | 4/2004 | Unkle et al. | 714/39 |
| 2004/0250163 | A1 * | 12/2004 | Roddy et al. | 714/25 |

FOREIGN PATENT DOCUMENTS

| | | |
|---|---|---|
| JP | 02-213948 | 8/1990 |
| JP | 6-222937 | 8/1994 |
| JP | 08-314751 | 11/1996 |
| JP | 2003-256367 | 9/2003 |

* cited by examiner

*Primary Examiner*—Michael C Maskulinski
(74) *Attorney, Agent, or Firm*—Antonelli, Terry, Stout & Kraus, LLP.

(57) ABSTRACT

The method includes confirmation policy processing for acquiring confirmation item information indicating a condition every confirmation item to distinguish a cause at time of fault occurrence, reading presumed cause information indicating a presumed cause corresponding to each pattern in the confirmation item information when a confirmation item value of a confirmation object satisfies a condition in the confirmation item information, and acquiring a presumed cause corresponding to the confirmation item information of the condition; execution policy processing for executing contents of a measure against the presumed cause read from execution policy information; evaluation policy processing for acquiring evaluation item information to evaluate a measure result, judging an effect of the executed measure based on whether an evaluation item value of an evaluation object is in a stable operation range, and storing a judging result; and controlling an autonomous policy cycle for conducting the confirmation, execution and evaluation policy processing.

26 Claims, 19 Drawing Sheets

| | | | | 11500 |
|---|---|---|---|---|
| 11501 | 11502 | 11503 | 11504 | |
| PATTERN NAME | PRESUMED CAUSE | CAUSE PROBABILITY [%] | AUTOMATIC EXECUTION CAUSE PROBABILITY [%] | |
| PATTERN 1 | CAUSE 1 | 90 | 70 | |
| PATTERN 2 | CAUSE 2 | 80 | 70 | |
| PATTERN 3 | CAUSE 3 | 60 | 70 | |
| PATTERN 4 | CAUSE 4 | 50 | 60 | |
| ... | ... | ... | ... | |

FIG. 2

| COMPUTER NAME /11101 | IP ADDRESS /11102 | MONITORED SUBJECT NAME /11103 |
|---|---|---|
| AP-SERVER | 192.168.10.11 | BUSINESS APPLICATION 1 |
| | | BUSINESS APPLICATION 2 |
| | | APPLICATION SERVER |
| | | OPERATING SYSTEM |
| AP-SERVER2 | 192.168.10.12 | BUSINESS APPLICATION 1 |
| AP-SERVER3 | 192.168.10.13 | BUSINESS APPLICATION 1 |
| LB-SERVER | 192.168.10.21 | LOAD BALANCER |
| | | OPERATING SYSTEM |
| LB-SERVER2 | 192.168.10.22 | LOAD BALANCER |
| DB-SERVER | 192.168.10.31 | DATABASE |
| | | OPERATING SYSTEM |
| DB-SERVER2 | 192.168.10.32 | DATABASE |
| NW-SERVER | 192.168.10.41 | NETWORK 1 |
| | | NETWORK 2 |
| ST-SERVER | 192.168.10.51 | STORAGE |
| | | LOGICAL VOLUME 1 |
| | | LOGICAL VOLUME 2 |
| ST-SERVER2 | 192.168.10.52 | STORAGE |
| | | LOGICAL VOLUME 1 |
| | | LOGICAL VOLUME 2 |
| ... | ... | ... |

| BUSINESS APPLICATION CLASSIFICATION (11201) | BUSINESS OBJECT (11202) | IP ADDRESS (11203) | MONITORED SUBJECT NAME (11204) |
|---|---|---|---|
| BUSINESS AP1 | LB | 192.168.10.21 | LOAD BALANCER |
| | AP1 | 192.168.10.11 | BUSINESS APPLICATION 1 |
| | AP2 | 192.168.10.12 | BUSINESS APPLICATION 1 |
| | AP3 | 192.168.10.13 | BUSINESS APPLICATION 1 |
| | DB | 192.168.10.31 | DATABASE |
| | NETWORK | 192.168.10.41 | NETWORK 1 |
| | STORAGE | 192.168.10.51 | LOGICAL VOLUME 1 |
| | ... | ... | ... |

| HIGH-ORDER OBJECT (11211) | LOW-ORDER OBJECT (11212) |
|---|---|
| LB | AP1 |
| LB | AP2 |
| LB | AP3 |
| AP1 | DB |
| AP2 | DB |
| AP3 | DB |
| DB | NETWORK |
| NETWORK | STORAGE |
| ... | ... |

| FAULT PLACE | PATTERN NAME | THE NUMBER OF TIMES OF PATTERN MATCHING | THE NUMBER OF TIMES OF PATTERN VALIDITY | THE NUMBER OF TIMES OF PATTERN INVALIDITY | THE NUMBER OF TIMES OF PATTERN NON-MATCHING |
|---|---|---|---|---|---|
| AP1 | PATTERN 1 | 3 | 2 | 1 | 0 |
|  | PATTERN 2 | 1 | 1 | 0 |  |
|  | PATTERN 3 | 0 | 0 | 0 |  |
|  | PATTERN 4 | 0 | 0 | 0 |  |
| LB | PATTERN 6 | 4 | 4 | 0 | 1 |
|  | PATTERN 5 | 2 | 2 | 0 |  |
| DB | PATTERN 7 | 1 | 0 | 1 | 5 |
| STORAGE | PATTERN 10 | 10 | 9 | 1 | 0 |
|  | PATTERN 8 | 1 | 1 | 0 |  |
|  | PATTERN 9 | 0 | 0 | 0 |  |
| ... | ... | ... | ... | ... | ... |

FIG. 6

| PATTERN NAME | CONFIRMATION SUBJECT OBJECT | CONFIRMATION ITEM | OPERATOR | CAUSE DISTINGUISHING THRESHOLD |
|---|---|---|---|---|
| PATTERN 1 | AP1 | CPU UTILIZATION FACTOR | ≧ | 90% |
|  | DB | CPU UTILIZATION FACTOR | < | 40% |
| PATTERN 2 | AP1 | CPU UTILIZATION FACTOR | > | 80% |
|  | DB | RESPONSE TIME | ≧ | 10 SECONDS |
| PATTERN 3 | AP1 | CPU UTILIZATION FACTOR | < | 10% |
| PATTERN 4 | DB | RESPONSE TIME | ≧ | 10 SECONDS |
|  | Storage | LOGICAL VOLUME EMPTY CAPACITY | ≦ | 1GB |
| ... | ... | ... | ... | ... |

FIG. 7

| PATTERN NAME | PRESUMED CAUSE | CAUSE PROBABILITY [%] | AUTOMATIC EXECUTION CAUSE PROBABILITY [%] |
|---|---|---|---|
| PATTERN 1 | CAUSE 1 | 90 | 70 |
| PATTERN 2 | CAUSE 2 | 80 | 70 |
| PATTERN 3 | CAUSE 3 | 60 | 70 |
| PATTERN 4 | CAUSE 4 | 50 | 60 |
| ... | ... | ... | ... |

FIG. 8

| PRESUMED CAUSE | EXECUTION POLICY |
|---|---|
| CAUSE 1<br>INCREASE OF AP SERVER LOAD | ADD AP SERVER |
| CAUSE 2<br>INSUFFICIENCY IN CACHES FOR LOGICAL VOLUME I/O ASSIGNED TO STORAGE | INCREASE CACHES FOR LOGICAL VOLUME I/O ASSIGNED TO STORAGE |
| CAUSE 3<br>DECREASE OF AP SERVER LOAD | ELIMINATE AP SERVER |
| CAUSE 4<br>INSUFFICIENCY OF LOGICAL VOLUME CAPACITY IN STORAGE | INCREASE LOGICAL VOLUME CAPACITY |
| ... | ... |

FIG. 9

| PATTERN NAME | EVALUATION SUBJECT OBJECT | EVALUATION ITEM | STABLE OPERATION LOWER LIMIT VALUE | CAUSE DISTINGUISHING THRESHOLD |
|---|---|---|---|---|
| PATTERN 1 | AP1 | CPU UTILIZATION FACTOR | 0% | 40% |
|  | DB | CPU UTILIZATION FACTOR | 0% | 40% |
| PATTERN 2 | AP1 | CPU UTILIZATION FACTOR | 0% | 40% |
|  | DB | RESPONSE TIME | 0 SECOND | 1 SECOND |
| PATTERN 3 | AP1 | CPU UTILIZATION FACTOR | 30% | 60% |
| PATTERN 4 | DB | RESPONSE TIME | 0 SECOND | 1 SECOND |
|  | STORAGE | LOGICAL VOLUME EMPTY CAPACITY | 10GB | THERE IS NO UPPER LIMIT |
| ... | ... | ... | ... | ... |

FIG. 10

| BUSINESS APPLICATION CLASSIFICATION (11801) | CONFIGURATION INFORMATION (11802) |
|---|---|
| BUSINESS AP1 | BUSINESS CONFIGURATION INFORMATION 1 |
| | BUSINESS RELATION INFORMATION 1 |
| | PATTERN INFORMATION 1 |
| | CONFIRMATION ITEM INFORMATION 1 |
| | PRESUMED CAUSE INFORMATION 1 |
| | EXECUTION POLICY INFORMATION 1 |
| | EVALUATION ITEM INFORMATION 1 |
| BUSINESS AP2 | BUSINESS CONFIGURATION INFORMATION 2 |
| | BUSINESS RELATION INFORMATION 2 |
| | PATTERN INFORMATION 1 |
| | CONFIRMATION ITEM INFORMATION 3 |
| | PRESUMED CAUSE INFORMATION 1 |
| | EXECUTION POLICY INFORMATION 2 |
| | EVALUATION ITEM INFORMATION 3 |
| ... | ... |

| BUSINESS APPLICATION CLASSIFICATION (12201) | BUSINESS OBJECT (12202) |
|---|---|
| BUSINESS AP1 | AP1 |
| BUSINESS AP2 | DB |
| ... | ... |

| FAULT PLACE (12301) | PATTERN NAME (12302) | EXECUTED/UNEXECUTED OF CONFIRMATION POLICY (12303) |
|---|---|---|
| AP1 | PATTERN 1 | EXECUTED |
| | PATTERN 2 | UNEXECUTED |
| | PATTERN 3 | UNEXECUTED |
| | PATTERN 4 | UNEXECUTED |

| CONFIRMATION SUBJECT OBJECT (12401) | CONFIRMATION ITEM (12402) | OPERATOR (12403) | CAUSE DISTINGUISHING THRESHOLD (12404) | CONFIRMATION ITEM VALUE (12405) |
|---|---|---|---|---|
| AP1 | CPU UTILIZATION FACTOR | ≧ | 90% | 95% |
| DB | CPU UTILIZATION FACTOR | < | 40% | 37% |

FIG. 14

| 12501 | 12502 | 12503 | 12504 |
|---|---|---|---|
| PRESUMED CAUSE | CAUSE PROBABILITY [%] | EXECUTION POLICY EXECUTION RESULT | AUTOMATIC EXECUTION CAUSE PROBABILITY [%] |
| CAUSE 1 | 90 | NOT EFFECTIVE | 70 |

| 12701 | 12702 | 12703 | 12704 | 12705 | 12706 |
|---|---|---|---|---|---|
| EVALUATION SUBJECT OBJECT | EVALUATION ITEM | STABLE OPERATION LOWER LIMIT VALUE | STABLE OPERATION UPPER LIMIT VALUE | CONFIRMATION ITEM VALUE (ITEM VALUE BEFORE EXECUTION OF EXECUTION POLICY) | EVALUATION ITEM VALUE (ITEM VALUE AFTER EXECUTION OF EXECUTION POLICY) |
| AP1 | CPU UTILIZATION FACTOR | 0% | 40% | 95% | 85% |
| DB | CPU UTILIZATION FACTOR | 0% | 40% | 37% | 35% |

12700

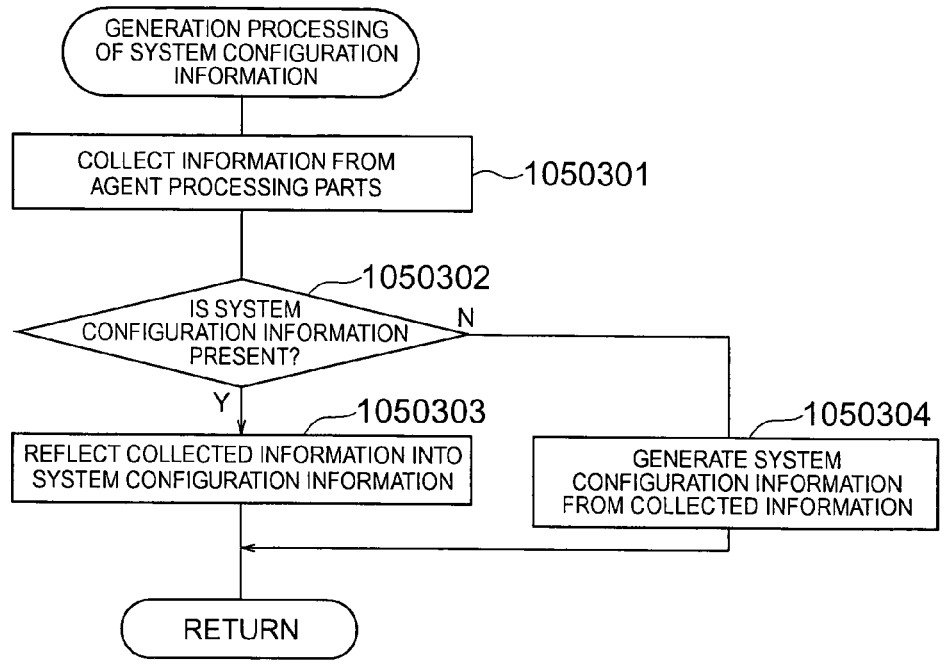
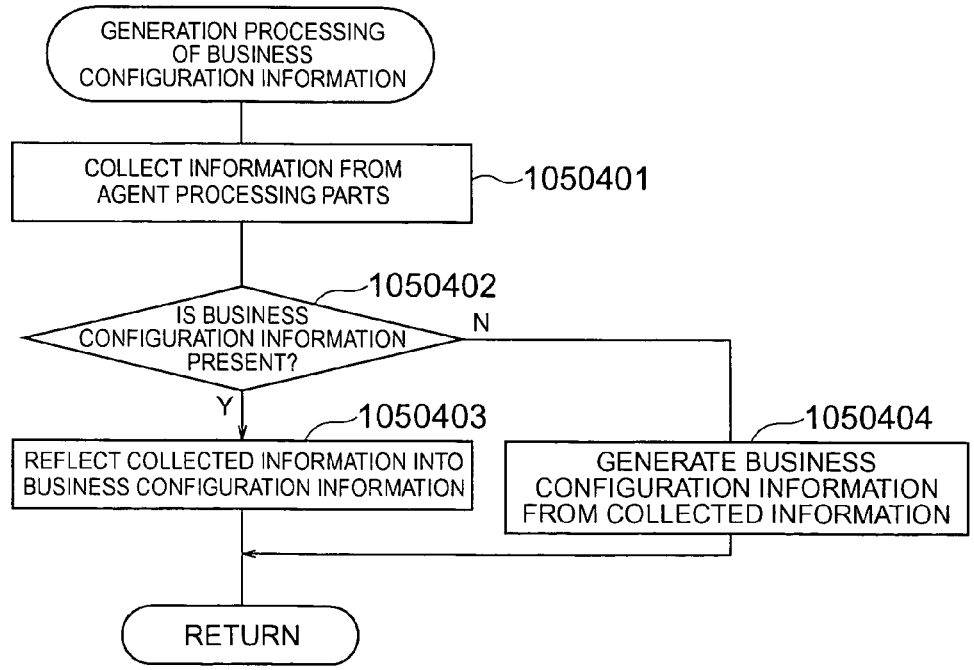

FIG. 24

| CONFIRMATION SUBJECT OBJECT | CONFIRMATION ITEM | OPERATOR | CAUSE DISTINGUISHING THRESHOLD | CONFIRMATION ITEM VALUE |
|---|---|---|---|---|
| AP1 | CPU UTILIZATION FACTOR | > | 80% | 84% |
| DB | RESPONSE TIME | ≧ | 10 SECONDS | 11 SECONDS |

FIG. 25

| EVALUATION SUBJECT OBJECT | EVALUATION ITEM | STABLE OPERATION LOWER LIMIT VALUE | STABLE OPERATION UPPER LIMIT VALUE | CONFIRMATION ITEM VALUE (ITEM VALUE BEFORE EXECUTION OF EXECUTION POLICY) | EVALUATION ITEM VALUE (ITEM VALUE AFTER EXECUTION OF EXECUTION POLICY) |
|---|---|---|---|---|---|
| AP1 | CPU UTILIZATION FACTOR | 0% | 40% | 84% | 7% |
| DB | RESPONSE TIME | 0 SECOND | 1 SECOND | 11 SECOND | 0.5 SECOND |

FIG. 26

| FAULT PLACE | PATTERN NAME | THE NUMBER OF TIMES OF PATTERN MATCHING | THE NUMBER OF TIMES OF PATTERN VALIDITY | THE NUMBER OF TIMES OF PATTERN INVALIDITY | THE NUMBER OF TIMES OF PATTERN NON-MATCHING |
|---|---|---|---|---|---|
| AP1 | PATTERN 2 | 2 | 2 | 0 | 0 |
| | PATTERN 1 | 4 | 2 | 2 | |
| | PATTERN 3 | 0 | 0 | 0 | |
| | PATTERN 4 | 0 | 0 | 0 | |
| LB | PATTERN 6 | 4 | 4 | 0 | 1 |
| | PATTERN 5 | 2 | 2 | 0 | |
| DB | PATTERN 7 | 1 | 0 | 1 | 5 |
| Storage | PATTERN 10 | 10 | 9 | 1 | 0 |
| | PATTERN 8 | 1 | 1 | 0 | |
| | PATTERN 9 | 0 | 0 | 0 | |
| ... | ... | ... | ... | ... | ... |

METHOD FOR CONTROLLING A POLICY

INCORPORATION BY REFERENCE

The present application claims priority from Japanese application JP 2005-341579 filed on Nov. 28, 2005, the content of which is hereby incorporated by reference into this application.

BACKGROUND OF THE INVENTION

The present invention relates to a policy control technique using a policy to control a computer. In particular, the present invention relates to a technique which is effective to application to a policy control technique used to distinguish a fault occurrence place and a cause and take a measure when a fault or abnormality has occurred in a computer.

In recent years, a lot of business in enterprises is conducted on a computer system for business connected to a communication network. Availability and reliability are required of this business system. On the other hand, if a fault or abnormality has occurred in a business application or the business system or unexpected overload has occurred, then undertaking loss in customer business and lowered confidence of customers are caused by business suspension or business slowdown. In order to minimize these business losses, an administrator who operates the business system is required to clear up the cause fast and execute a suitable measure.

An example of operation under the present state will now be described. First, work for putting infinitely existing events in order is conducted. Events include:
  an event issued by an operating system (OS);
  an event in which operation management software is present;
  an event issued by premise software (such as a database management system or Java) to operate a business application; and
  an event issued by a business application.

Version up in software typically increases event kinds and change contents.

Subsequently, an event issued upon a fault or abnormality is extracted from a manual or the like by manual work. And work of registering an action to be taken as a measure every event is conducted.

In not a few cases, however, there are a plurality of causes of fault or abnormality for a single event. It is difficult to distinguish an occurrence place and a cause of a fault or abnormality by using a single event. Therefore, it is possible only in a partial range to register actions for coping with an event, resulting in restricted operation.

In other words, when a fault or abnormality for which an action is not registered has occurred, measures cannot be taken, resulting in a problem.

If a fault or abnormality has occurred in a business system, a measure is executed in response to a message such as a fault notice sent from the business system at the present time. An example in which a measure is taken in response to a message is disclosed in, for example, JP-A-02-213948.

When executing a measure that corresponds to an event notice such as a notice of a fault and coping with the fault by utilizing the technique described in JP-A-02-213948, causes of the fault differ in some cases even if the fault notice event is the same. Causes of the fault differ in some cases according to the operation environment of the business application or the business system as well. In such a case, the only way of narrowing down fault causes in the conventional technique is to rely upon the experience and operation know-how of the administrator of the business system. Furthermore, each time business applications or fault causes increase, it is necessary to change registration of events and interpretation and decision of event contents. In addition, if a fault notice event is not given as a notice, it cannot be determined whether a fault has occurred. Even if an event notice is received, the issue origin of the event is not the fault occurrence place, in not a few cases. Therefore, it is considered substantially impossible for a person other than experts to distinguish the fault occurrence place and fault cause. Even if it is possible, a heavy burden is cast upon the user and much time and labor are needed.

A technique described in Japanese Patent No. 3291642 (corresponding to JP-A-08-314751) is a technique that makes it possible to display case data successively while giving priority to instance data having a higher frequency information value in retrieval history data. The CPU, phenomenon, cause, measure, and field (such as the product field) are used as retrieval keys.

SUMMARY OF THE INVENTION

An object of the present invention is to provide a technique that makes it possible to solve the above-described problems and cope with a fault more efficiently without conducting event registration and analysis of event contents while taking a business application as the unit, even when business applications or fault causes have increased.

In accordance with the present invention, in a policy control apparatus that distinguishes a fault occurrence place and a cause and take a measure by using policies when a fault or abnormality has occurred in a computer, policy processes for acquiring a presumed cause by using a pattern of a confirmation item value of a confirmation subject object when a fault has occurred, executing a measure, and judging an effect are conducted in order.

If a fault or abnormality has occurred in a computer included in a system, the policy control apparatus first conducts confirmation policy processing. In other words, confirmation item information which indicates a condition every confirmation item for distinguishing a cause at the time when a fault has occurred is acquired from a storage apparatus. A confirmation item value of a confirmation subject object is compared with a condition of a confirmation item in the confirmation item information to determine whether the confirmation item value of the confirmation subject object satisfies the condition in the confirmation item information. If the confirmation item value of the confirmation subject object satisfies the condition in the confirmation item information, then presumed cause information which indicates a presumed cause corresponding to each pattern in the confirmation item information is read out from the storage apparatus. A presumed cause corresponding to the pattern in the confirmation item information for a condition satisfied by the confirmation item value of the confirmation subject object is acquired from the presumed cause information.

After conducting the confirmation policy processing, the policy control apparatus according to the present invention reads out execution policy information which indicates contents of a measure for coping with the presumed cause acquired in the confirmation policy processing, from the storage apparatus.

Thereafter, in evaluation processing, evaluation item information for evaluating a result of the measure is acquired from the storage apparatus. An evaluation item value of an evaluation subject object is compared with information of a stable operation range indicated in the evaluation item information to determine whether the evaluation item value of the evaluation subject object is in the stable operation range indicated in the evaluation item information. According to whether the evaluation item value of the evaluation subject object is in the stable operation range indicated in the evaluation item information, the effect of the measure are judged. A result of the judgment is stored in the storage apparatus. As a result, the number of times of pattern validity and information indicating the probability of the presumed cause in the confirmation item is updated.

The autonomous policy cycle in which the confirmation policy processing, the execution policy processing and the evaluation policy processing are conducted in order is executed. Even when business applications or fault causes have increased, therefore, a fault is coped with, without conducting event registration and analysis of event contents while taking a business application as the unit. By conducting the processing successively in the decreasing order of the number of times of pattern validity and the cause probability, it is possible to cope with a fault more efficiently.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing details of system configuration information 11100 in the embodiment;

FIG. 3 is a diagram showing details of business configuration information 11200 in the embodiment;

FIG. 4 is a diagram showing details of business relation information 11210 in the embodiment;

FIG. 5 is a diagram showing details of pattern information 11300 in the embodiment;

FIG. 6 is a diagram showing details of confirmation item information 11400 in the embodiment;

FIG. 7 is a diagram showing details of presumed cause information 11500 in the embodiment;

FIG. 8 is a diagram showing details of execution policy information 11600 in the embodiment;

FIG. 9 is a diagram showing details of evaluation item information 11700 in the embodiment;

FIG. 10 is a diagram showing details of business application configuration information 11800 in the embodiment;

FIG. 11 is a diagram showing details of a fault business list 12200 in the embodiment;

FIG. 12 is a diagram showing details of a pattern list 12300 in the embodiment;

FIG. 13 is a diagram showing details of a confirmation item list 12400 in the embodiment;

FIG. 14 is a diagram showing details of a presumed cause list 12500 in the embodiment;

FIG. 15 is a diagram showing details of an evaluation item list 12700 in the embodiment;

FIG. 17 is a flowchart showing a processing procedure of generation processing of system configuration information 11100 in the embodiment;

FIG. 18 is a flowchart showing a processing procedure of generation processing of business configuration information 11200 in the embodiment;

FIG. 24 is a diagram showing an example of a confirmation item list 12400 updated in processing S0022 in the embodiment;

FIG. 25 is a diagram showing an example of an evaluation item list 12700 updated in processing S0031 in the embodiment;

FIG. 26 is a diagram showing an example of pattern information 11300 after completion of autonomous policy cycle processing in the embodiment.

DESCRIPTION OF THE EMBODIMENTS

Hereafter, a policy control apparatus in an embodiment which distinguishes a fault occurrence place and a cause by using a policy and takes a measure when a fault or abnormality has occurred in a computer will be described.

Figure 1:
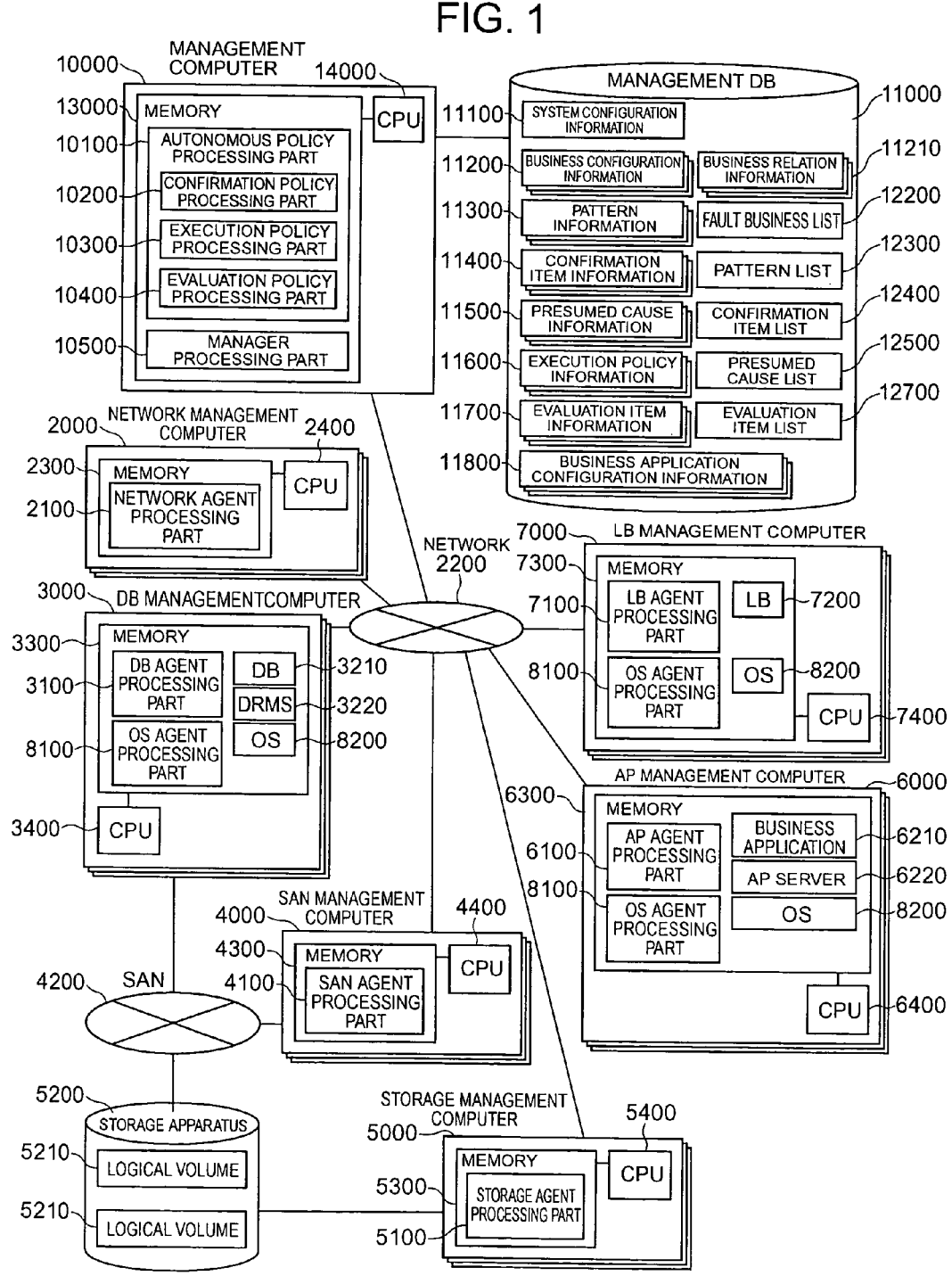
FIG. 1 is a diagram showing an example of a system configuration in an embodiment.

FIG. 1 is a diagram showing an example of a system configuration in the present embodiment. In the present embodiment, a management computer 10000, a network management computer 2000, a DB management computer 3000, a SAN management computer 4000, a storage management computer 5000, an AP management computer 6000 and an LB management computer 7000 are connected to a network 2200 as shown in FIG. 1. The DB management computer 3000, the SAN management computer 4000 and a storage apparatus 5200 are connected to a SAN 4200. The SAN 4200 stands for storage area network. The SAN 4200 may be connected to the network 2200.

The management computer 10000 manages the network management computer 2000, the DB management computer 3000, the SAN management computer 4000, the storage management computer 5000, the AP management computer 6000 and the LB management computer 7000 as computers to be managed.

The management computer 10000 includes an autonomous policy processing part 10100, a confirmation policy processing part 10200, an execution policy processing part 10300, an evaluation policy processing part 10400, a manager processing part 10500, a memory 13000 and a CPU 14000. The management computer 10000 has a management DB 11000.

The autonomous policy processing part 10100 requests the confirmation policy processing part 10200, the execution policy processing part 10300, the evaluation policy processing part 10400 and the manager processing part 10500 to conduct processing, and controls autonomous policy processing.

The confirmation policy processing part 10200 confirms values of confirmation items of confirmation subject objects included in business, fixes a presumed cause of fault occurrence, or executes a confirmation policy for narrowing down. The execution policy processing part 10300 executes an execution policy that corresponds to a presumed cause fixed or narrowed down in the confirmation policy processing part 10200, and copes with a fault that has occurred. The evaluation policy processing part 10400 executes an evaluation policy to evaluate whether an execution policy executed in the execution policy processing part 10300 is effective to a fault that has occurred.

The manager processing part 10500 issues a request to agent processing parts such as a network agent processing part 2100, a DB agent processing part 3100, a SAN agent processing part 4100, a storage agent processing part 5100, an AP agent processing part 6100, an LB agent processing part 7100 and an OS agent processing part 8100. The manager processing part 10500 acquires values of items (confirmation items of confirmation subject objects or evaluation items of evaluation subject objects) of business objects managed by the agent processing parts. Furthermore, the manager processing part 10500 distinguishes the business object in which the fault has occurred, on the basis of a fault event, and requests the autonomous policy processing part 10100 to exercise control using an autonomous policy cycle.

The CPU 14000 controls the whole management computer 10000. The CPU 14000 implements various functions of the management computer 10000 by reading out the autonomous policy processing part 10100, the confirmation policy processing part 10200, the execution policy processing part 10300, the evaluation policy processing part 10400 and the manager processing part 10500 including codes for conducting various operations according to the present embodiment into the memory 13000 and executing them.

The management DB 11000 is a database for storing a table and a list that define the operation know-how for exercising autonomous policy control. The management DB 11000 includes system configuration information 11100, business configuration information 11200, business relation information 11210, pattern information 11300, confirmation item information 11400, presumed cause information 11500, execution policy information 11600, evaluation item information 11700, business application configuration information 11800, a fault business list 12200, a pattern list 12300, a confirmation item list 12400, a presumed cause list 12500 and an evaluation item list 12700.

The system configuration information 11100 is a table for storing information of computers included in the business system. The business configuration information 11200 is a table for storing mapping information objects included in business and the system. The business relation information 11210 is a table for storing relations among objects included in business.

The pattern information 11300 is a table for storing correspondence between fault places and pattern names confirmed using the confirmation policy. The confirmation item information 11400 is a table for storing correspondence between pattern names and items confirmed using the confirmation policy. The presumed cause information 11500 is a table for storing presumed causes that correspond to pattern names. The execution policy information 11600 is a table for storing correspondence between presumed causes and execution policies. The evaluation item information 11700 is a table for storing correspondence between pattern names and items evaluated using the evaluation policy.

The business application configuration information 11800 is a table for retaining information of the business configuration information 11200, the business relation information 11210, the pattern information 11300, the confirmation item information 11400, the presumed cause information 11500, the execution policy information 11600 and the evaluation item information 11700, which are mapped to business application classification.

The fault business list 12200 is a list for retaining information of a business application and a business object in which a fault has occurred. The pattern list 12300 is a list for managing executed/unexecuted of the confirmation policy. The confirmation item list 12400 is a list for retaining a confirmation item value acquired from a confirmation subject object when the confirmation policy has been executed. The presumed cause list 12500 is a list for retaining a result obtaining by executing an execution policy to cope with the presumed cause. The evaluation item list 12700 is a list for retaining an evaluation item value acquired from an evaluation subject object when an evaluation policy is executed.

The system configuration information 11100, the business configuration information 11200, the business relation information 11210, the pattern information 11300, the confirmation item information 11400, the presumed cause information 11500, the execution policy information 11600, the evaluation item information 11700, the business application configuration information 11800, the fault business list 12200, the pattern list 12300, the confirmation item list 12400, the presumed cause list 12500 and the evaluation item list 12700 are retained in the memory. However, they are preserved as files as well.

The network management computer 2000 includes the network agent processing part 2100, a memory 2300 and a CPU 2400, and manages the network 2200. The network agent processing part 2100 collects information concerning the network 2200 in response to a request given by the manager processing part 10500 in the management computer 10000. The CPU 2400 controls the whole network management computer 2000. The CPU 2400 implements various functions of the network management computer 2000 by reading out the network agent processing part 2100 including codes for conducting various operations according to the present embodiment into the memory 2300 and executing it.

The DB management computer 3000 includes the DB agent processing part 3100, the OS agent processing part 8100, a memory 3300 and a CPU 3400, and manages a DB 3210, a DBMS 3220, an OS 8200. The DB agent processing part 3100 collects information collects information concerning the DB 3210 and the DBMS 3220 in response to a request given by the manager processing part 10500 in the management computer 10000.

The CPU 3400 controls the whole DB management computer 3000. The CPU 3400 implements various functions of the DB management computer 3000 by reading out the DB agent processing part 3100 and the OS agent processing part 8100 including codes for conducting various operations according to the present embodiment into the memory 3300 and executing them. The DB 3210 and the DBMS 3220 may operate on the same computer as the DB agent processing part 3100, or may operate on a different computer. The OS agent processing part 8100 collects information concerning the OS 8200. The OS agent processing part 8100 collects information concerning the OS 8200 in response to a request given by the manager processing part 10500 in the management computer 10000. The OS 8200 may operate on the same computer as the OS agent processing part 8100, or may operate on a different computer.

The SAN management computer 4000 includes the SAN agent processing part 4100, a memory 4300 and a CPU 4400, and manages the SAN 4200. The SAN agent processing part 4100 collects information concerning the SAN 4200 in response to a request given by the manager processing part 10500 in the management computer 10000. The CPU 4400 controls the whole SAN management computer 4000. The CPU 4400 implements various functions of the SAN management computer 4000 by reading out the SAN agent processing part 4100 including code for conducting various operations according to the present embodiment into the memory 4300 and executing it.

The storage management computer 5000 includes the storage agent processing part 5100, a memory 5300 and a CPU 5400, and manages the storage apparatus 5200. The storage agent processing part 5100 collects information concerning the storage apparatus 5200 and a logical volume 5210 in response to a request given by the manager processing part 10500 in the management computer 10000. The CPU 5400 controls the whole storage management computer 5000. The CPU 5400 implements various functions of the storage management computer 5000 by reading out the storage agent processing part 5100 including code for conducting various operations according to the present embodiment into the memory 5300 and executing it.

The AP management computer 6000 includes the AP agent processing part 6100, the OS agent processing part 8100, a memory 6300 and a CPU 6400. The AP management computer 6000 manages a business application 6210, an AP server 6220 and the OS 8200. The AP agent processing part 6100 collects information concerning the business application 6210 and the AP server 6220 in response to a request given by the manager processing part 10500 in the management computer 10000. The CPU 6400 controls the whole AP management computer 6000. The CPU 6400 implements various functions of the AP management computer 6000 by reading out the AP agent processing part 6100 and the OS agent processing part 8100 including codes for conducting various operations according to the present embodiment into the memory 6300 and executing them. The business application 6210 and the AP server 6220 may operate on the same computer as the AP agent processing part 6100, or may operate on a different computer.

The LB management computer 7000 includes the LB agent processing part 7100, the OS agent processing part 8100, a memory 7300 and a CPU 7400. The LB management computer 7000 manages an LB 7200 and the OS 8200. The LB agent processing part 7100 collects information concerning the LB 7200 in response to a request given by the manager processing part 10500 in the management computer 10000. The CPU 7400 controls the whole LB management computer 7000. The CPU 7400 implements various functions of the LB management computer 7000 by reading out the LB agent processing part 7100 and the OS agent processing part 8100 including codes for conducting various operations according to the present embodiment into the memory 7300 and executing them. The LB 7200 may operate on the same computer as the LB agent processing part 7100, or may operate on a different computer. As for business applications in the business system, there are a web three-layer application which operates in the DBMS 3220, the AP server 6220 and the LB 7200, a batch application which operates in the DBMS 3220 and the AP server 6220, or an on-line application.

In the present embodiment, a program for causing a computer to function as the processing parts is recorded on a recording medium such as a CD-ROM, stored on a magnetic disk or the like, loaded in a memory, and executed. The recording medium for recording the program may be a recording medium other than the CD-ROM. The program may be installed from the recording medium into an information processing apparatus and used, or the recording medium may be accessed through the network to use the program.

FIG. 2 is a diagram showing details of the system configuration information 11100 in the present embodiment. As shown in FIG. 2, a computer name 11101, an IP address 11102 and a monitoring subject name 11103 are retained in the system configuration information 11100 as information.

Objects managed by the agent processing parts such as the network agent processing part 2100, the DB agent processing part 3100, the SAN agent processing part 4100, the storage agent processing part 5100, the AP agent processing part 6100, the LB agent processing part 7100 and the OS agent processing part 8100 are distinguished uniquely on the basis of the IP address 11102 and the monitoring subject name 11103.

The system configuration information 11100 is updated by the manager processing part 10500 when a change notice having a monitoring subject name is sent to the manager processing part 10500 by an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100, or when the manager processing part 10500 has collected information. It is possible to distinguish the monitored object on the basis of the system configuration information 11100.

FIG. 3 is a diagram showing details of the business configuration information 11200 in the present embodiment. As shown in FIG. 3, a business application classification 11201, a business object 11202, an IP address 11203, and a monitoring subject name 11204 are retained in the business configuration information 11200 as information.

The business configuration information 11200 is present every business, and it is generated by the administrator beforehand. Or the manager processing part 10500 generates and updates the business configuration information 11200. The business configuration information 11200 is updated by the manager processing part 10500 by the manager processing part 10500 when a change notice having a monitoring subject name is sent to the manager processing part 10500 by an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100, or when the manager processing part 10500 has collected information.

The administrator generates mapping of the business object 11202, the IP address 11203 and the monitoring subject name 11204 in the business configuration information 11200 by referring to the IP address 11102 and the monitoring subject name 11103.

The business application classification 11201 indicates a name of a business application classification. Objects managed by the agent processing parts such as the network agent processing part 2100, the DB agent processing part 3100, the SAN agent processing part 4100, the storage agent processing part 5100, the AP agent processing part 6100, the LB agent processing part 7100 and the OS agent processing part 8100 are distinguished uniquely on the basis of the IP address 11203 and the monitoring subject name 11204.

FIG. 4 is a diagram showing details of the business relation information 11210 in the present embodiment. As shown in FIG. 4, a high order object 11211 and a low order object 11212 are retained in the business relation information 11210 as information.

The business relation information 11210 is present every business, and it is generated by the administrator beforehand. The high order object 11211 indicates a business object that occupies the high order in the business application configuration. The low order object 11212 indicates a business object that occupies the low order in the business application configuration. It is indicated that business-business relation information is set between the high order object 11211 and the low order object 11212.

FIG. 5 is a diagram showing details of the pattern information 11300 in the present embodiment. As shown in FIG. 5, a fault place 11301, a pattern name 11302, the number of times of pattern matching 11303, the number of times of pattern validity 11304, the number of times of pattern invalidity 11305 and the number of times of pattern non-matching 11306 are retained in the pattern information 11300 as information.

The pattern information 11300 is present every business, and it is generated by the administrator beforehand. A pattern for confirming using a confirmation policy or a pattern for evaluating using an evaluation policy is defined every fault place 11301.

The fault place 11301 indicates an object in which a fault has occurred. The pattern name 11302 indicates a pattern name to be confirmed using a confirmation policy or a pattern name to be evaluated using an evaluation policy. The pattern means a list of items to be confirmed using the confirmation policy or a list of items to be evaluated using the evaluation policy.

The number of times of pattern matching indicates the number of times patterns square with each other a hundred percent (pattern matching) when the confirmation policy has been executed. The number of times of pattern validity 11304 indicates the number of times the effect is obtained when the execution policy and the evaluation policy are executed according to a result of execution of the confirmation policy. The number of times of pattern invalidity 11305 indicates the number of times the effect is not obtained when the execution policy and the evaluation policy are executed according to a result of execution of the confirmation policy.

The number of times of pattern non-matching 11306 indicates the number of times the patterns do not match although the confirmation policy has been executed with every pattern name 11302 corresponding to the fault place 11301. If the number of times of pattern non-matching 11306 is great, it is indicated that the number of patterns for the fault place 11301 is small and the administrator can recognize the necessity of pattern addition.

FIG. 6 is a diagram showing details of the confirmation item information 11400 in the present embodiment. As shown in FIG. 6, a pattern name 11401, a confirmation subject object 11402, a confirmation item 11403, an operator 11404 and a cause distinguishing threshold 11405 are retained in the confirmation item information 11400 as information.

The confirmation item information 11400 is present every business, and it is generated by the administrator beforehand. The confirmation subject object 11402, the confirmation item 11403, the operator 11404 and the cause distinguishing threshold 11405 are stored in a list form every pattern name 11401.

The pattern name 11401 indicates a name of a pattern to be confirmed using the confirmation policy. The confirmation subject object 11402 indicates a name of an object to be confirmed using the confirmation policy. The confirmation item 11403 indicates an item to be confirmed using the confirmation policy. The operator 11404 indicates an operator for determining whether a value of the confirmation item 11403 for the confirmation subject object 11402 has exceeded the cause distinguishing threshold 11405. As the operator 11404, "<", "≦", ">", "≧" or "=" can be set. The operator "<" indicates that the value of the confirmation item 11403 is less than the cause distinguishing threshold 11405. The operator "≦" indicates that the value of the confirmation item 11403 is equal to or less than the cause distinguishing threshold 11405. The operator ">" indicates that the value of the confirmation item 11403 is greater than the cause distinguishing threshold 11405. The operator "≧" indicates that the value of the confirmation item 11403 is equal to or greater than the cause distinguishing threshold 11405. The operator "=" indicates that the value of the confirmation item 11403 is equal to the cause distinguishing threshold 11405.

The cause distinguishing threshold 11405 indicates a threshold for the confirmation subject object 11402 and the confirmation item 11403.

Even if different pattern names have completely the same lists in the confirmation subject object 11402 and the confirmation item 11403, a cause of a fault which has occurred can be distinguished by providing the value of the operator 11404 with a change or a feature. Parameters according to the operation environment can be set by changing setting in the operator 11404 and the cause distinguishing threshold 11405.

FIG. 7 is a diagram showing details of the presumed cause information 11500 in the present embodiment. As shown in FIG. 7, a pattern name 11501, a presumed cause 11502, a cause probability 11503 and an automatic execution cause probability 11504 are retained in the presumed cause information 11500 as information.

The presumed cause information 11500 is present every business, and it is generated by the administrator beforehand. The presumed cause 11502, the cause probability 11503 and the automatic execution cause probability 11504 are stored in a list form every pattern name 11501. The pattern name 11501 indicates a name of a pattern confirmed using the confirmation policy. The presumed cause 11502 indicates a confirmed fault occurrence cause.

The cause probability 11503 indicates the probability of the presumed cause 11502. As the cause probability 11503 becomes greater, the possibility that the presumed cause 11502 is the true cause is high. The automatic execution cause probability 11504 indicates a threshold of the cause probability 11503 for automatically executing an execution policy that corresponds to the presumed cause 11502. Parameters according to the operation environment can be set by changing the setting of the cause probability 11503 and the automatic execution cause probability 11504.

FIG. 8 is a diagram showing details of the execution policy information 11600 in the present embodiment. As shown in FIG. 8, a presumed cause 11601 and an execution policy 11602 are retained in the execution policy information 11600 as information.

The execution policy information 11600 is present every business, and it is generated by the administrator beforehand. The execution policy 11602 indicates a policy for coping with the presumed cause 11601.

FIG. 9 is a diagram showing details of the evaluation item information 11700 in the present embodiment. As shown in FIG. 9, a pattern name 11701, an evaluation subject object 11702, an evaluation item 11703, a stable operation lower limit value 11704 and a stable operation upper limit value 11705 are retained in the evaluation item information 11700 as information.

The evaluation item information 11700 is present every business, and it is generated by the administrator beforehand. The evaluation subject object 11702, the evaluation item 11703, the stable operation lower limit value 11704 and the stable operation upper limit value 11705 are stored in a list form every pattern name 11701.

The pattern name 11701 indicates a name of a pattern evaluated using an evaluation policy. The evaluation subject object 11702 indicates a name of an object evaluated using the evaluation policy. The evaluation item 11703 indicates an item evaluated using the evaluation policy. The stable operation lower limit value 11704 indicates a lower limit value of a threshold representing that the evaluation subject object 11702 is in stable operation. The stable operation upper limit value 11705 indicates an upper limit value of the threshold representing that the evaluation subject object 11702 is in stable operation. Parameters according to the operation environment can be set by changing the setting of the stable operation lower limit value 11704 and the stable operation upper limit value 11705.

Furthermore, it can be evaluated whether a service level goal of business is maintained by setting an item of a service level representing the quality of the business in the evaluation item information 11700 and specifying a condition of the service level goal in the range between the stable operation lower limit value 11704 and the stable operation upper limit value 11705.

FIG. 10 is a diagram showing details of the business application configuration information 11800 in the present embodiment. As shown in FIG. 10, a business application classification 11801 and configuration information 11802 are retained in the business application configuration information 11800 as information.

The business application configuration information 11800 is generated by the administrator beforehand. The business application classification 11801 indicates a name of a business application classification. The configuration information 11802 retains business configuration information 11200, business relation information 11210, pattern information 11300, confirmation item information 11400, presumed cause information 11500, execution policy information 11600 and evaluation item information 11700, which correspond to the business application classification.

FIG. 11 is a diagram showing details of the fault business list 12200 in the present embodiment. As shown in FIG. 11, a business application classification 12201 and a business object 12202 are retained in the fault business list 12200 as information.

The fault business list 12200 is generated by event decision processing 10507 in the manager processing part 10500. The business application classification 12201 indicates a name of a business application classification in which a fault or a load increase has occurred. The business object 12202 indicates a name of a business object in which a fault or a load increase has occurred.

FIG. 12 is a diagram showing details of the pattern list 12300 in the present embodiment. As shown in FIG. 12, a fault place 12301, a pattern name 12302 and executed/unexecuted 12303 of confirmation policy are retained in the pattern list 12300 as information.

The pattern list 12300 is generated by the autonomous policy processing part 10100 which conducts sorting in the decreasing order of the number of times of pattern matching 11303 or the number of times of pattern validity 11304 in the pattern information 11300 on the basis of the pattern information 11300. The fault place 12301 indicates an object in which a fault has occurred. The pattern name 12302 indicates a pattern name to be confirmed using a confirmation policy or a pattern name to be evaluated using an evaluation policy. The executed/unexecuted 12303 of confirmation policy indicates whether the confirmation policy is already executed, and "executed" or "unexecuted" is set therein. The "executed" indicates that the confirmation policy is already executed, whereas the "unexecuted" indicates that the confirmation policy is not yet executed.

FIG. 13 is a diagram showing details of the confirmation item list 12400 in the present embodiment. As shown in FIG. 13, a confirmation subject object 12401, a confirmation item 12402, an operator 12403, a cause distinguishing threshold 12404 and a confirmation item value 12405 are retained in the confirmation item list 12400 as information.

The confirmation item list 12400 is generated by the confirmation policy processing part 10200 on the basis of the confirmation item information 11400. The confirmation subject object 12401 indicates a name of an object confirmed using the confirmation policy. The confirmation item 12402 indicates an item confirmed using the confirmation policy. The operator 12403 indicates an operator for determining whether the confirmation item value 12405 which is a value for the confirmation item 12402 of the confirmation subject object 12401 has exceeded the cause distinguishing threshold 12404. As the operator 12403, "<", "≦", ">", "≧" or "=" can be set. The operator "<" indicates that the confirmation item value 12405 is less than the cause distinguishing threshold 12404. The operator "≦" indicates that the confirmation item value 12405 is equal to or less than the cause distinguishing threshold 12404. The operator ">" indicates that the confirmation item value 12405 is greater than the cause distinguishing threshold 12404. The operator "≧" indicates that the confirmation item value 12405 is equal to or greater than the cause distinguishing threshold 12404. The operator "=" indicates that the confirmation item value 12405 is equal to the cause distinguishing threshold 12404.

The cause distinguishing threshold 12404 indicates a threshold for the confirmation subject object 12401 and the confirmation item 12402. The confirmation item value 12405 indicates a value for the confirmation subject object 12401 and the confirmation item 12402, which is acquired by the manager processing part 10500 by issuing a request to an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100. If the confirmation item value 12405 is not yet acquired, "−" indicating that it is not yet acquired is set.

FIG. 14 is a diagram showing details of the presumed cause list 12500 in the present embodiment. As shown in FIG. 14, a presumed cause 12501, a cause probability 12502, an execution policy execution result 12503 and an automatic execution cause probability 12504 are retained in the presumed cause list 12500 as information.

The presumed cause list 12500 is generated by the confirmation policy processing part 10200 on the basis of information in the presumed cause information 11500. The presumed cause 12501 indicates a fault occurrence cause to be confirmed. The cause probability 12502 indicates a probability of the presumed cause 12501. As the cause probability 12502 becomes greater, there is a higher possibility that the presumed cause 12501 is the true cause. The execution policy execution result 12503 indicates an execution result of an execution policy. "Unexecuted," "not effective," or "effective" is set in the execution policy execution result 12503. The unexecuted" indicates that the execution policy is not yet executed. "Not effective" indicates that a measure taken by the execution policy has been ineffective to the fault. "Effective" indicates that a measure taken by the execution policy has been effective to the fault. The automatic execution cause probability 12504 indicates a threshold for the cause probability 12502 for automatically executing an execution policy that corresponds to the presumed cause 12501.

FIG. 15 is a diagram showing details of the evaluation item list 12700 in the present embodiment. As shown in FIG. 15, an evaluation subject object 12701, an evaluation item 12702, a stable operation lower limit value 12703 and a stable operation upper limit value 12704, a confirmation item value (item value before execution of the execution policy) 12705 and an evaluation item value (item value after execution of the execution policy) 12706 are retained in the evaluation item list 12700 as information.

The evaluation item list 12700 is generated by the evaluation policy processing part 10400 on the basis of information of the evaluation item information 11700 and the confirmation item list 12400. The evaluation subject object 12701 indicates a name of an object evaluated using the evaluation policy. The evaluation item 12702 indicates an item evaluated using the evaluation policy. The stable operation lower limit value 12703 indicates a lower limit value of a threshold that represents that the evaluation subject object 12701 is in stable operation. The stable operation upper limit value 12704 indicates an upper limit value of a threshold that represents that the evaluation subject object 12701 is in stable operation.

In the confirmation item value (item value before execution of the execution policy) 12705, the confirmation item value 12405 in the confirmation item list 12400 is set. The confirmation item value 12705 indicates the item value obtained before execution of the execution policy. The evaluation item value (item value after execution of the execution policy) 12706 indicates a value for the evaluation subject object 12701 and the evaluation item 12702 acquired by the manager processing part 10500 by issuing a request to an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100. Furthermore, the evaluation item value 12706 indicates the item value obtained after execution of the execution policy. If the confirmation item value (item value before execution of the execution policy) 12705 and the evaluation item value (item value after execution of the execution policy) 12706 are not yet acquired, then "–" indicating that the item values are not yet acquired is set.

Figure 16:
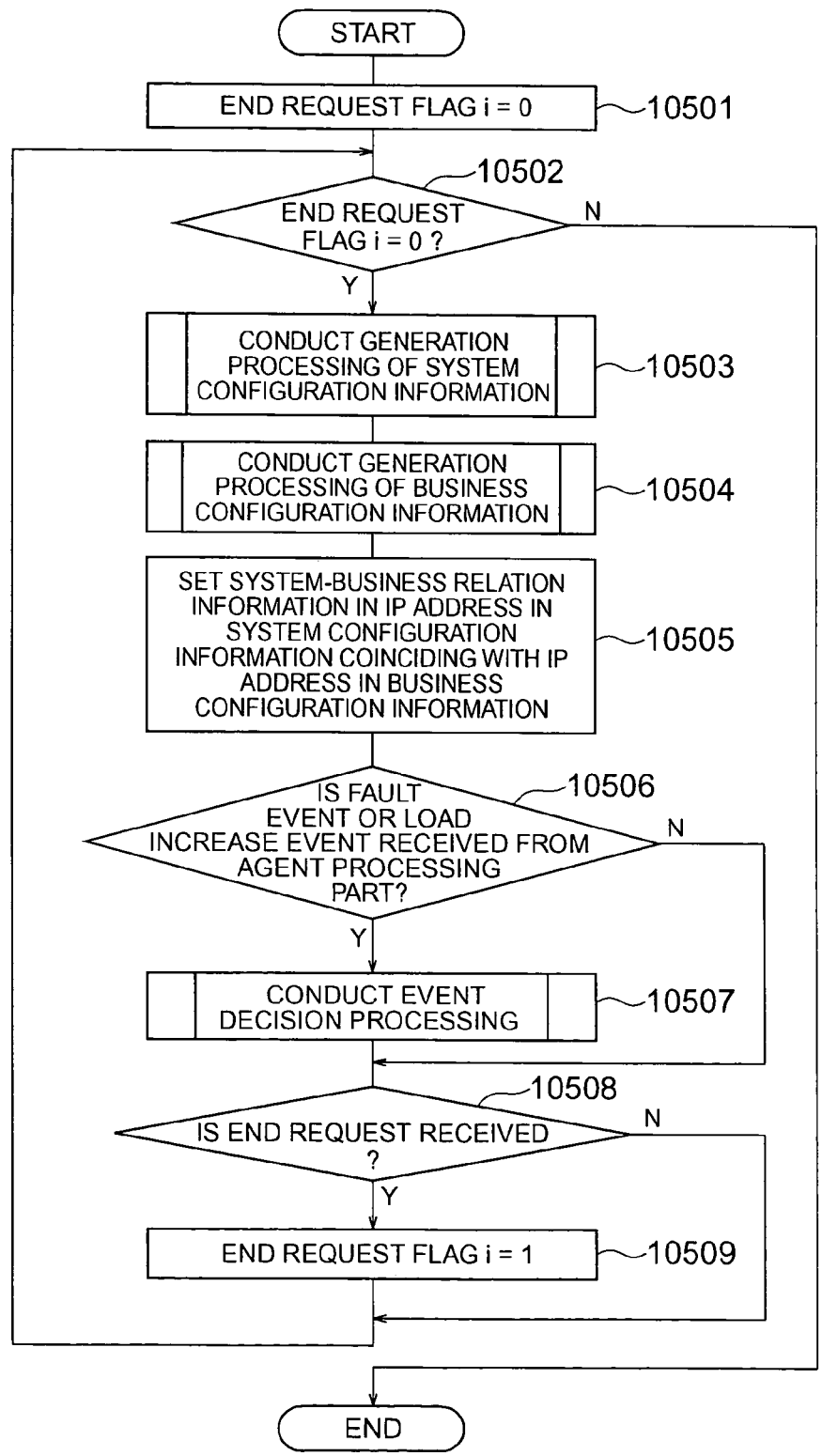
FIG. 16 is a flowchart showing a processing procedure in a manager processing part 10500 in the embodiment.

FIG. 16 is a flowchart showing a processing procedure of the manager processing part 10500 in the present embodiment. Processing in the manager processing part 10500 will now be described with reference to the flowchart shown in FIG. 16.

First, 0 is set in an end request flag i which indicates whether an end request has been received (10501). If the end request flag i is 0, then it is indicated that the end request has not been received. If the end request flag i is not 0, then it is indicated that the end request has been received. Subsequently, it is determined whether the end request flag i is 0 (10502). If the end request flag i is not 0 in the processing conducted at the step 10502, then it is recognized that the end request has been received and the processing is terminated. If the end request flag i is 0 in the processing conducted at the step 10502, generation processing of the system configuration information 11100 is conducted (10503). A detailed flowchart of the generation processing of the system configuration information 11100 will be described later with reference to FIG. 17. Subsequently, generation processing of the business configuration information 11200 is conducted (10504). A detailed flowchart of generation processing of the business configuration information 11200 will be described later with reference to FIG. 18.

Subsequently, system-business relation information is set for an IP address 11203 in the business configuration information 11200 that coincides with an IP address 11102 in the system configuration information 11100 (10505).

Subsequently, it is determined whether a fault event or a load increase event has been received from an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100 (10506).

If it is found by processing at the step 10506 that a fault event or a load increase event has been received from an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100, then event decision processing is conducted (10507) and it is determined whether an end request has been received (10508).

If it is found by processing at the step 10506 that a fault event or a load increase event has not been received from an agent processing part such as the network agent processing part 2100, the DB agent processing part 3100, the SAN agent processing part 4100, the storage agent processing part 5100, the AP agent processing part 6100, the LB agent processing part 7100 or the OS agent processing part 8100, then it is determined whether an end request has been received (10508). If it is found in the processing at the step 10508 that an end request has been received, then 1 is set in an end request flag i (10509) and the processing returns to the step 10502 to continue the processing at the step 10502 and subsequent steps. If it is found in the processing at the step 10508 that an end request is not received, then the processing returns to the step 10502 and the processing at the step 10502 and subsequent steps is continued.

FIG. 17 is a flowchart showing a processing procedure for generation processing of the system configuration information 11100 in the present embodiment. The generation processing of the system configuration information will now be described with reference to a flowchart shown in FIG. 17.

First, information is collected from the agent processing parts such as the network agent processing part 2100, the DB agent processing part 3100, the SAN agent processing part 4100, the storage agent processing part 5100, the AP agent processing part 6100, the LB agent processing part 7100 and the OS agent processing part 8100 (1050301).

Subsequently, it is determined whether the system configuration information 11100 is present (1050302). If it is found in the processing at the step 1050302 that the system configuration information 11100 is present, then a difference of the collected information is reflected into the system configuration information 11100 (1050303) and the processing is terminated. If it is found in the processing at the step 1050302 that the system configuration information 11100 is not present, then the system configuration information 11100 is generated from the collected information (1050304) and the processing is terminated.

FIG. 18 is a flowchart showing a processing procedure for generation processing of the business configuration information 11200 in the present embodiment. The generation processing of the business configuration information will now be described with reference to a flowchart shown in FIG. 18.

First, information is collected from the agent processing parts such as the network agent processing part 2100, the DB agent processing part 3100, the SAN agent processing part 4100, the storage agent processing part 5100, the AP agent processing part 6100, the LB agent processing part 7100 and the OS agent processing part 8100 (1050401).

Subsequently, it is determined whether the business configuration information 11200 is present (1050402). If it is found in the processing at the step 1050402 that the business configuration information 11200 is present, then a difference of the collected information is reflected into the existing business configuration information 11200 (1050403) and the processing is terminated. If it is found in the processing at the step 1050402 that the business configuration information 11200 is not present, then the business configuration information 11200 is generated from the collected information (1050404) and the processing is terminated.

Figure 19:
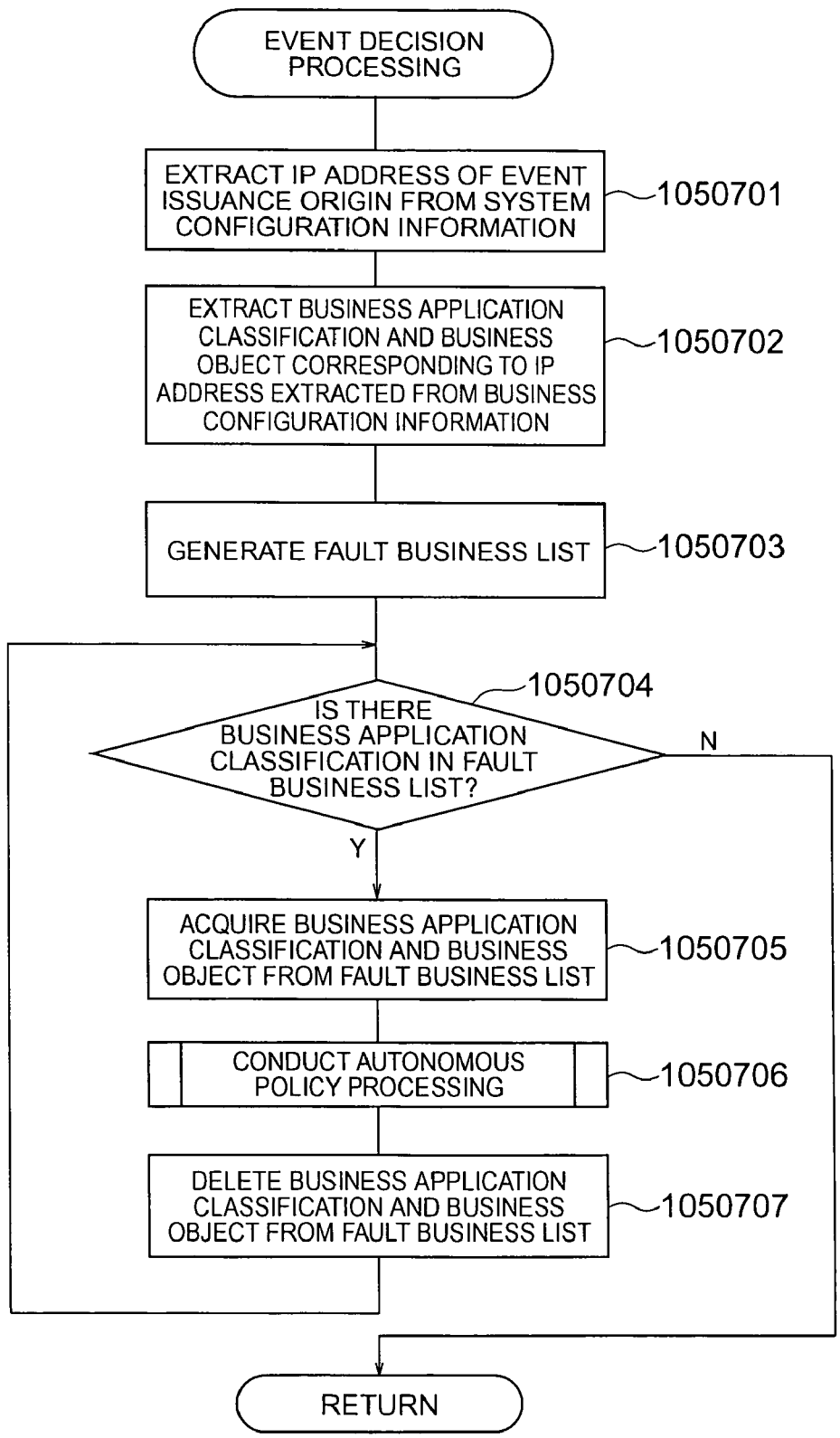
FIG. 19 is a flowchart showing a processing procedure of event decision processing in the embodiment.

FIG. 19 is a flowchart showing a processing procedure of even decision processing in the present embodiment. The event decision processing will now be described with reference to the flowchart shown in FIG. 19.

First, the IP address 11102 of a computer that has issued a fault event or a load increase event is extracted from the system configuration information 11100 (1050701). Subsequently, the system-business relation information is traced from the IP address 11102 extracted by the processing at the step 1050701. And the business application classification 11201 and the business object 11202 affected by the influence of the fault or load increase are extracted from the business configuration information (1050702).

Subsequently, the fault business 12200 is generated from the business object 11202 and the business application classification 11201 extracted by the processing at the step 1050702 (1050703). It is determined whether the business application classification 12201 is present in the fault business list 12200 generated by the processing at the step 1050703 (1050704). If it is found in the processing at the step 1050704 that the business application classification 12201 is present in the fault business list 12200, then the business application classification 12201 and the business object 12202 are acquired from the fault business list 12200 (1050705).

Then, autonomous policy processing is executed utilizing the business application classification 12201 and the business object 12202 acquired by the processing at the step 1050705 (1050706). A detailed flowchart of the autonomous policy processing will be described with reference to FIG. 20. Subsequently, the business application classification 12201 and the business object 12202 acquired by the processing at the step 1050705 are deleted from the fault business list 12200 (1050707). The processing returns to the processing at the step 1050704, and the processing at the step 1050704 and subsequent steps is continued. If it is found in the processing at the step 1050704 that the business application classification 12201 is not present in the fault business list 12200, then the processing is terminated.

Figure 20:
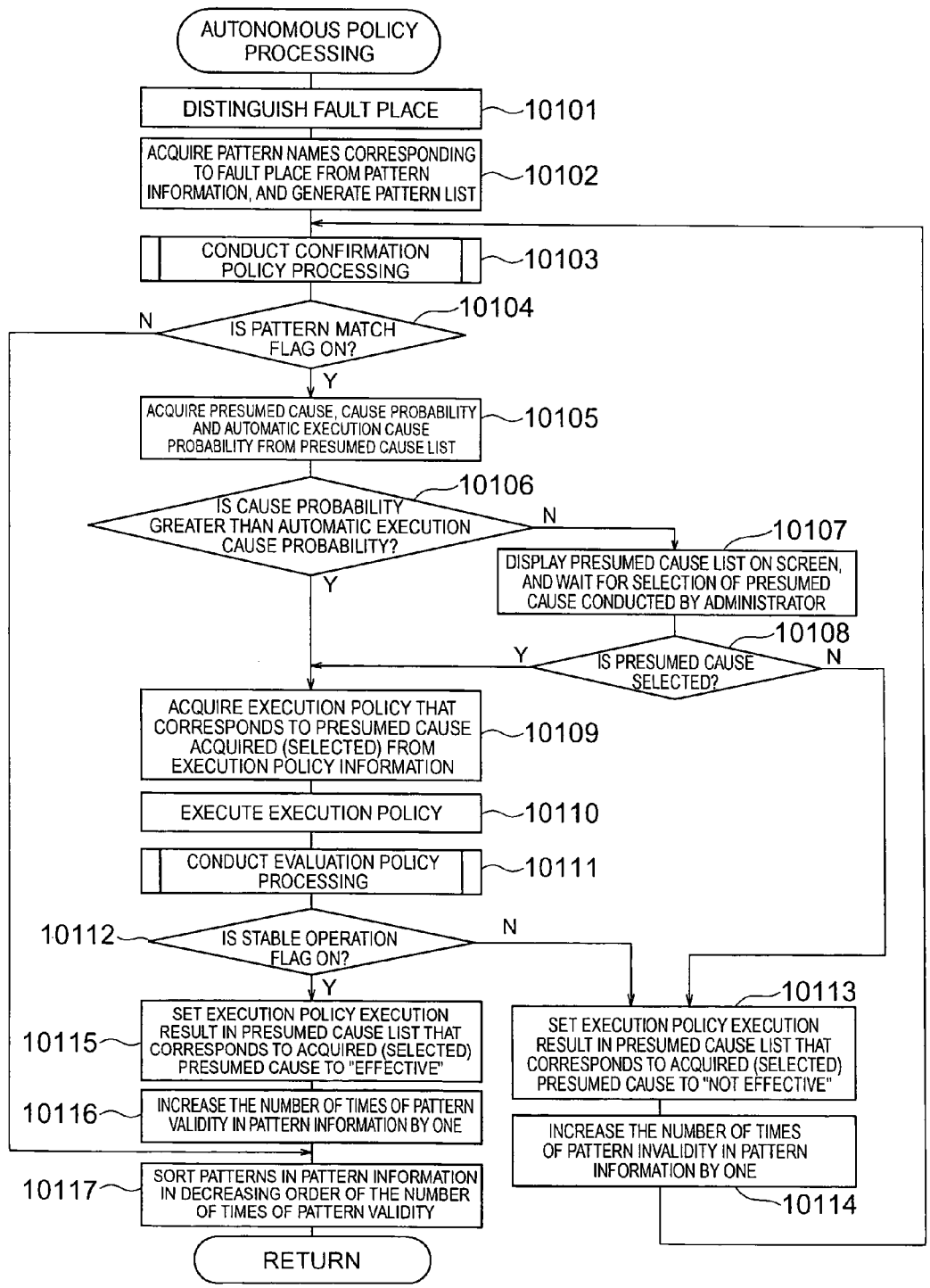
FIG. 20 is a flowchart showing a processing procedure in an autonomous policy processing part 10100 in the embodiment.

FIG. 20 is a flowchart showing a processing procedure of the autonomous policy processing part 10100 in the present example. The autonomous policy processing will now be described with reference to the flowchart shown in FIG. 20.

First, a fault place is distinguished to find a business in which a fault has occurred (10101). In the discrimination of the fault, the pattern information 11300, the confirmation item information 11400, the presumed cause information 11500, the execution policy information 11600 and the evaluation item information 11700 delivered from the manager processing part 10500 are acquired from the business application configuration information 11800, and the business object 12202 delivered from the manager processing part 10500 is distinguished as the fault place (10101). The pattern information 11300, the confirmation item information 11400, the presumed cause information 11500, the execution policy information 11600 and the evaluation item information 11700 acquired by the processing at the step 10101 are utilized in the autonomous policy processing at step 10102 and subsequent steps.

Subsequently, the pattern names 11302 corresponding to the fault place distinguished by the processing at the step 10101 are acquired from the pattern information 11300, and the pattern list 12300 is generated (10102). As for the executed/unexecuted 12303 of confirmation policy in the pattern list 12300, initial setting values are set to "unexecuted."

Subsequently, confirmation policy processing is executed in the confirmation policy processing part 10200 (10103). A detailed flowchart of the confirmation policy processing 10103 will be described later with reference to FIG. 21. Subsequently, it is determined whether a pattern match flag set in the confirmation policy processing 10103 (at step 10210 or step 10219 in the confirmation policy processing part 10200) is on or off (10104). If it is found in the processing at the step 10104 that the pattern match flag is on, then the presumed cause 12501, the cause probability 12502 and the automatic execution cause probability 12504 are acquired from the presumed cause list 12500 generated in the confirmation policy processing 10103 (step 10209 in the confirmation policy processing part 10200) (10105).

Subsequently, comparison is conducted to determine whether the cause probability 12502 acquired in the processing at the step 10105 is greater than the automatic execution cause probability 12504 acquired in the processing at the step 10105 (10106).

In this way, the probabilities are compared with each other in the processing at the step 10106. If the cause probability 12502 is greater than the automatic execution cause probability 12504, then an execution policy can be automatically executed. If it is found in the processing at the step 10106 that the cause probability 12502 is less than the automatic execution cause probability 12504, then the presumed cause list 12500 is displayed on the screen and selection of the presumed cause 12501 conducted by the administrator is waited for (10107). It is determined whether the administrator has selected the presumed cause 12501 (10108).

If it is found in the processing at the step 10106 that the cause probability 12502 is greater than the automatic execution cause probability 12504, then the execution policy 11602 that corresponds to the presumed cause 12501 acquired in the processing at the step 10105 from the execution policy information 11600 is acquired (10109).

If the presumed cause 12501 is selected in the processing at the step 10108, then an execution policy 11602 that corresponds to the presumed cause 12501 selected from the execution policy information 11600 in the processing at the step 10108 is acquired (10109).

Subsequently, the execution policy acquired in the processing at the step 10109 is executed in the processing at the step 10109 (10110). Here, processing such as AP server addition which is contents of an execution policy can be conducted without intervention of the administrator's work. Subsequently, evaluation policy processing is executed in the evaluation policy processing part 10400 (10111).

A detailed flowchart of the processing conducted at the step 10111 will be described later with reference to FIG. 22.

Subsequently, it is determined whether a stable operation flag set in the evaluation policy processing 10111 (in the evaluation policy processing part 10400 at step 10409 or step 10411) is on or off (10112).

If it is found in the processing at the step 10112 that the stable operation flag is on, then the execution policy execution result 12503 in the presumed cause list 12500 that corresponds to the presumed cause 12501 acquired in the processing at the step 10105 or selected in the processing at the step 10108 is set to "effective" (10115). The number of times of pattern validity 11304 in the pattern information 11300 that corresponds to the pattern name acquired in the confirmation policy processing 10103 (in the confirmation policy processing part 10200 at step 10202) is increased by one (10116). The pattern names 11302 in the pattern information 11300 are sorted in the decreasing order of the number of times of pattern validity 11304 (10117), and the autonomous policy processing is terminated. If the numbers of times of pattern validity are equal, then a pattern name 11302 finally increased in the number of times of pattern validity by one is disposed in a higher rank.

Since the pattern names are sorted in the order of the number of times of pattern validity, the patterns can be confirmed in the descending order of the pattern validity probability. The patterns may be sorted in the order of the number of times of pattern matching 11303, in the order of the number of times of pattern validity 11304, or in the order of the number of times of pattern invalidity 11305. In the case of a business application in which a measure according to the execution policy results in a one-hundred percent success, the patterns should be sorted in the decreasing order of the number of times of pattern matching 11303. In the case of a business application in which a measure according to the execution policy cannot fail, the patterns should be sorted in the increasing order of the number of times of pattern invalidity 11305.

If it is found in the processing at the step 10112 that the stable operation flag is off, then the execution policy execution result 12503 in the presumed cause list 12500 that corresponds to the presumed cause 12501 acquired in the processing at the step 10105 or selected in the processing at the step 10108 is set to "not effective" (10113). After the processing at the step 10113, or if the administrator does not select the presumed cause 12501 in the processing at the step 10108, then the number of times of pattern invalidity 11305 in the pattern information 11300 that corresponds to the pattern name acquired in the confirmation policy processing 10103 (in the confirmation policy processing part 10200 at step 10202) is increased by one, and the processing returns to the confirmation policy processing 10103 to repeat the confirmation policy processing 10103 and subsequent processing (10114).

Figure 21:
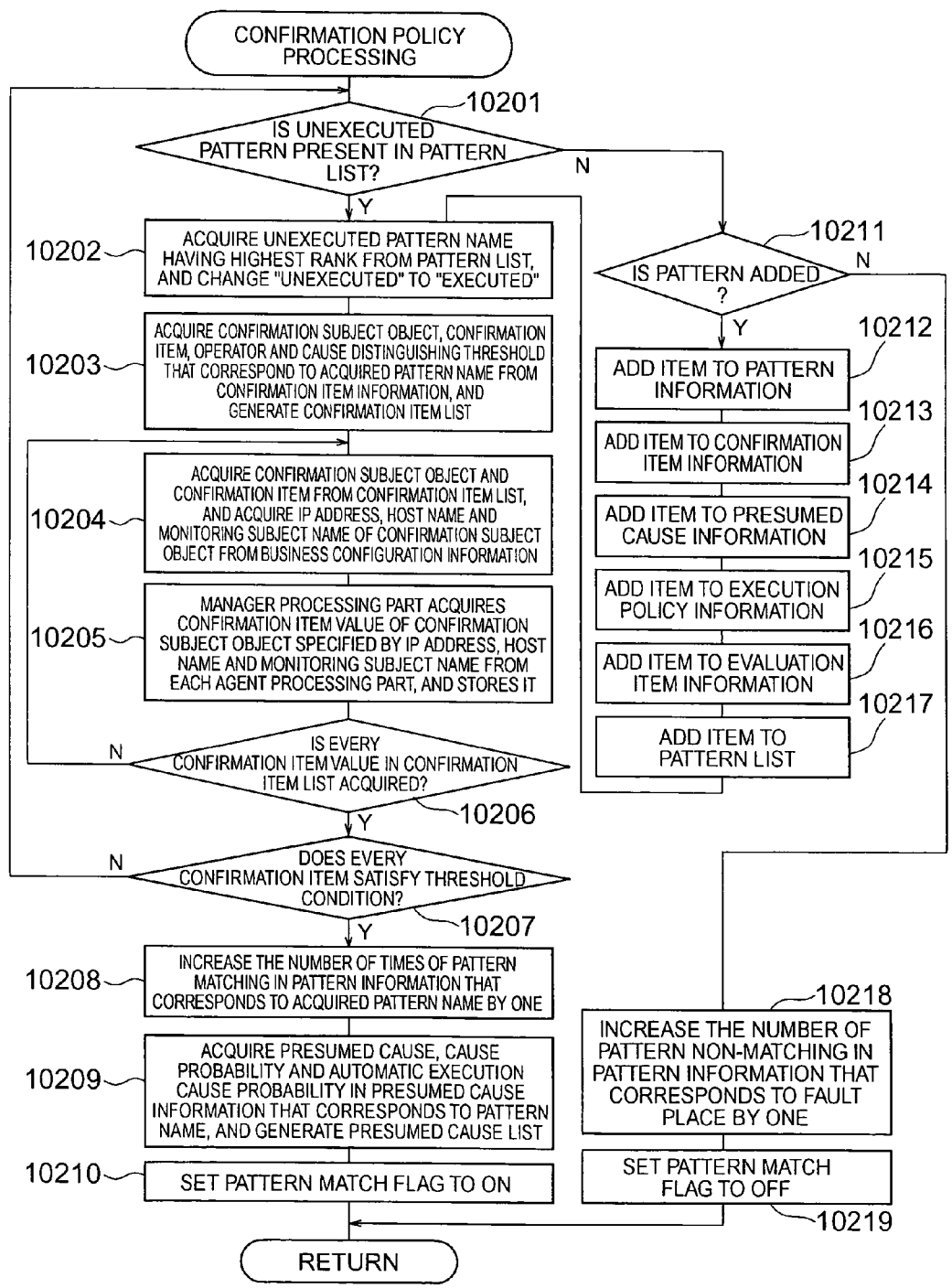
FIG. 21 is a flowchart showing a processing procedure in a confirmation policy processing part 10200 in the embodiment.

FIG. 21 is a flowchart showing a processing procedure in the confirmation policy processing part 10200 in the present embodiment. The confirmation policy processing will now be described with reference to the flowchart shown in FIG. 21.

First, it is determined whether a pattern name 12302 having "unexecuted" in the executed/unexecuted 12303 of the confirmation policy is present in the pattern list 12300 generated in the autonomous policy processing part 10100 at the step 10102 (10201). If it is found in the processing at the step 10201 that a pattern name 12302 having "unexecuted" in the executed/unexecuted 12303 of the confirmation policy is present, then a pattern name 12302 having a highest rank and having "unexecuted" in the executed/unexecuted 12303 of the confirmation policy is acquired from the pattern list 12300, and the executed/unexecuted 12303 of the confirmation policy in the pattern list 12300 that corresponds to the acquired pattern name 12302 is changed from "unexecuted" to "executed." (10202).

Subsequently, the confirmation subject object 11402, the confirmation item 11403, the operator 11404 and the cause distinguishing threshold 11405 that correspond to the pattern name 12302 acquired in the processing at the step 10202 are acquired from the confirmation item information 11400, and the confirmation item list 12400 is generated (10203). An initial setting value for the confirmation item value 12405 in the confirmation item list 12400 is set to "–" which indicates that it is not yet acquired.

Subsequently, the confirmation subject object 12401 and the confirmation item 12402 having "–" in the confirmation item value 12405 are acquired from the confirmation item list 12400. In addition, the IP address 11203 and the monitoring subject name 11204 that correspond to the acquired confirmation subject object 12401 are acquired from the business configuration information 11200 (10204).

The manager processing part 10500 acquires a value of the confirmation item 12402 acquired in the processing at the step 10204 from each of the agent processing parts, such as the network agent processing part 2100, the DB agent processing part 3100, the SAN agent processing part 4100, the storage agent processing part 5100, the AP agent processing part 6100, the LB agent processing part 7100 and the OS agent processing part 8100, on the basis of an object that is distinguished using the IP address 11203 and the monitoring subject name 11204 acquired in the processing at the step 10204, and stores the value in the confirmation item value 12405 in the confirmation item list 12400 (10205).

Subsequently, it is determined whether every confirmation item value 12405 in the confirmation item list 12400 has been acquired (10206). If it is found in the processing at the step 10206 that every confirmation item value 12405 is not acquired, then the processing returns to the step 10204, and the processing at the step 10204 and subsequent steps is repeated. If it is found in the processing at the step 10206 that every confirmation item value 12405 is acquired, then it is determined whether every confirmation item value 12405 in the confirmation item list 12400 satisfies the condition of the cause distinguishing threshold 12404 according to the value in the operator 12403 (10207).

If it is found in the processing at the step 10207 that every confirmation item value 12405 in the confirmation item list 12400 satisfies the condition of the cause distinguishing threshold 12404 according to the value in the operator 12403, the number of times of pattern matching 11300 in the pattern information 11300 that corresponds to the pattern name 12302 acquired in the processing at the step 10202 is increased by one (10208). The presumed cause 11502, the cause probability 11503 and the automatic execution cause probability 11504 that correspond to the pattern name 12302 acquired in the processing at the step 10202 are acquired from the presumed cause information 11500, and the presumed cause list 12500 is generated (10209). As for the execution policy execution result 12503 in the presumed cause list 12500, its initial setting value is set to "unexecuted." Subsequently, the pattern match flag is set to on (10210), and the confirmation policy processing is terminated.

If it is found in the processing at the step 10201 that a pattern name 12302 having "unexecuted" in the executed/unexecuted 12303 of the confirmation policy is not present, then it is determined whether the administrator newly adds a pattern (10211). If it is found in the processing at the step 10211 that a pattern is newly added, then the administrator adds items to the pattern information 11300, the confirmation item information 11400, the presumed cause information 11500, the execution policy information 11600 and the evaluation item information 11700 (steps 10212 to 10216). In addition, the administrator adds an item to the pattern list 12300 with the value of executed/unexecuted of the confirmation policy being set to "unexecuted" (10217). The processing returns to the processing at the step 10202, and the processing at the step 10202 and the subsequent steps is repeated.

If it is found in the processing at the step 10211 that a pattern is not newly added, then the number of times of pattern non-matching 11306 in the pattern information 11300 that corresponds to the fault place distinguished in the processing conducted by the autonomous policy processing part 10100 at the step 10101 is increased by one (10218). Subsequently, the pattern match flag is set to off (10219), and the confirmation policy processing is terminated.

Figure 22:
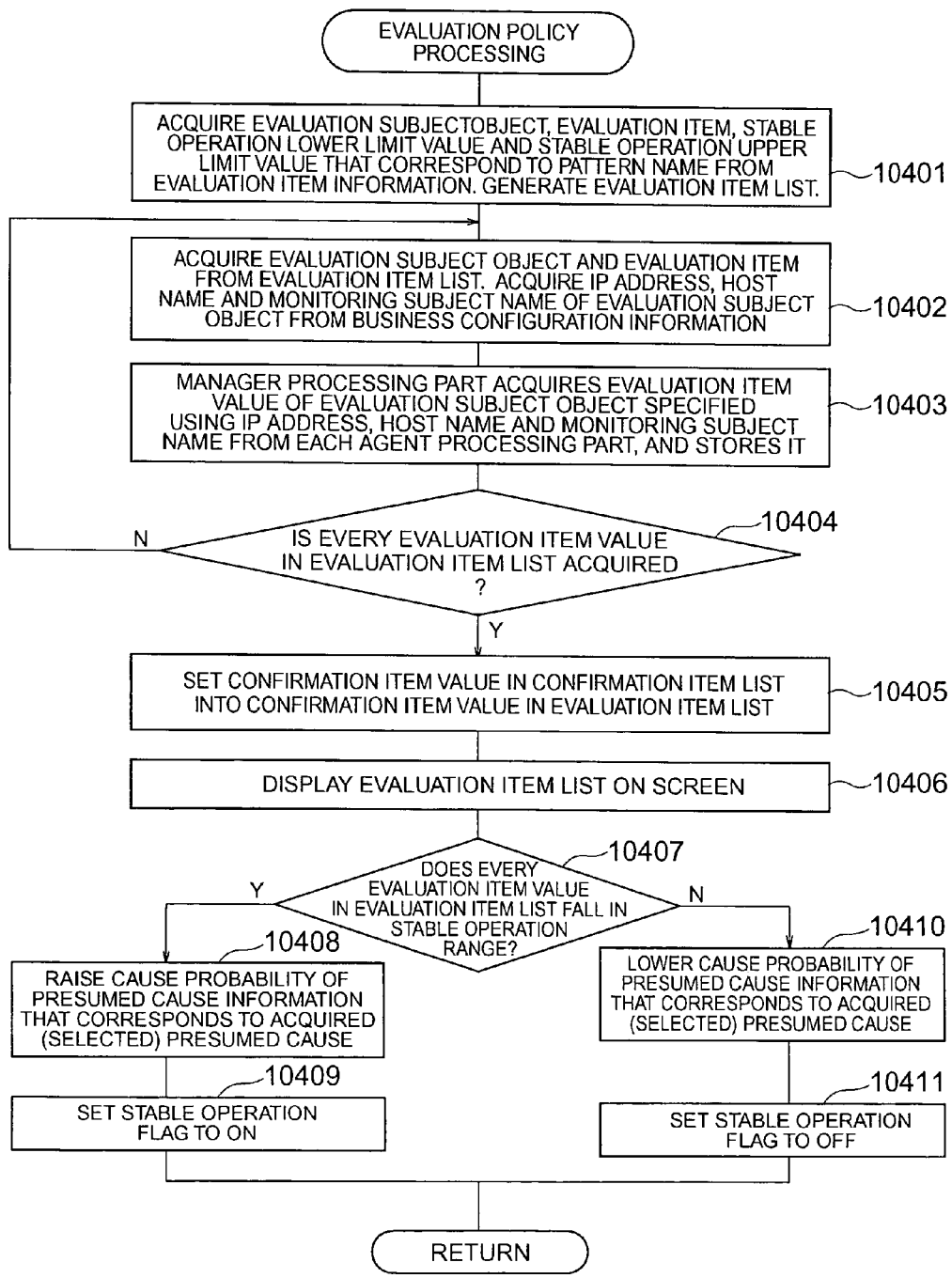
FIG. 22 is a flowchart showing a processing procedure in an evaluation policy processing part 10400 in the embodiment.

FIG. 22 is a flowchart showing a processing procedure of the evaluation policy processing part in the present embodiment. The evaluation policy processing will now be described with reference to the flowchart shown in FIG. 22.

First, the evaluation subject object 11702, the evaluation item 11703, the stable operation lower limit value 11704 and the stable operation upper limit value 11705 that correspond to the pattern name 12302 acquired in the confirmation policy processing part 10200 at the step 10202 are acquired from the evaluation item information 11700, and the evaluation item list 12700 is generated (10401). An initial setting value for the confirmation item value (item value before execution of the execution policy) 12705 and the evaluation item value (item value after execution of the execution policy) 12706 in the evaluation item list 12700 is set to "–" which indicates that it is not yet acquired.

Subsequently, the evaluation subject object 12701 and the evaluation item 12702 having "–" in the evaluation item value 12706 are acquired from the evaluation item list 12700. In addition, the IP address 11203 and the monitoring subject name 11204 that correspond to the acquired evaluation subject object 12701 are acquired from the business configuration information 11200 (10402).

Subsequently, the manager processing part 10500 acquires a value of the evaluation item 12702 acquired in the processing at the step 10402 from each of the agent processing parts, such as the network agent processing part 2100, the DB agent processing part 3100, the SAN agent processing part 4100, the storage agent processing part 5100, the AP agent processing part 6100, the LB agent processing part 7100 and the OS agent processing part 8100, on the basis of an object that is distinguished using the IP address 11203 and the monitoring subject name 11204 acquired in the processing at the step 10402, and stores the value in the evaluation item value 12706 (item value after execution of the execution policy) in the evaluation item list 12700 (10403).

Subsequently, it is determined whether every evaluation item value 12706 in the evaluation item list 12700 has been acquired (10404). If it is found in the processing at the step 10404 that every evaluation item value (item value after execution of the execution policy) 12706 is not acquired, then the processing returns to the step 10402, and the processing at the step 10402 and subsequent steps is repeated.

If it is found in the processing at the step 10404 that the every evaluation item value (item value after execution of the execution policy) 12706 is acquired, then the confirmation item values 12405 in the confirmation item list 12400 are set into the confirmation item values 12705 (item values before execution of the execution policy) in the evaluation item list 12700 (10405), and the evaluation item list 12700 is displayed on the screen (10406).

Subsequently, it is determined whether every evaluation item value (item value after execution of the execution policy) 12706 is a value between the stable operation lower limit value 12703 and the stable operation upper limit value 12704 (10407). If it is found in the processing at the step 10407 that every evaluation item value (item value after execution of the execution policy) 12706 is a value between the stable operation lower limit value 12703 and the stable operation upper limit value 12704, then the value of the cause probability 11503 in the presumed cause information 11500 that corresponds to the presumed cause 12501 acquired in the processing in the autonomous policy processing part 10100 at the step 10105 or the presumed cause 12501 selected in the processing in the autonomous policy processing part 10100 at the step 10108 is raised (10408). The numerical value of the raise in the cause probability 11503 in the processing at the step 10408 can be set by the administrator.

Subsequently, the stable operation flag is set to on (10409), and the evaluation policy processing is terminated. If it is found in the processing at the step 10407 that every evaluation item value (item value after execution of the execution policy) 12706 is not a value between the stable operation lower limit value 12703 and the stable operation upper limit value 12704, then the value of the cause probability 11503 in the presumed cause information 11500 that corresponds to the presumed cause 12501 acquired in the processing in the autonomous policy processing part 10100 at the step 10105 or the presumed cause 12501 selected in the processing in the autonomous policy processing part 10100 at the step 10108 is lowered (10410). The numerical value of the lowering in the cause probability 11503 in the processing at the step 10410 can be set by the administrator. Subsequently, the stable operation flag is set to off (10410), and the evaluation policy processing is terminated.

Figure 23:
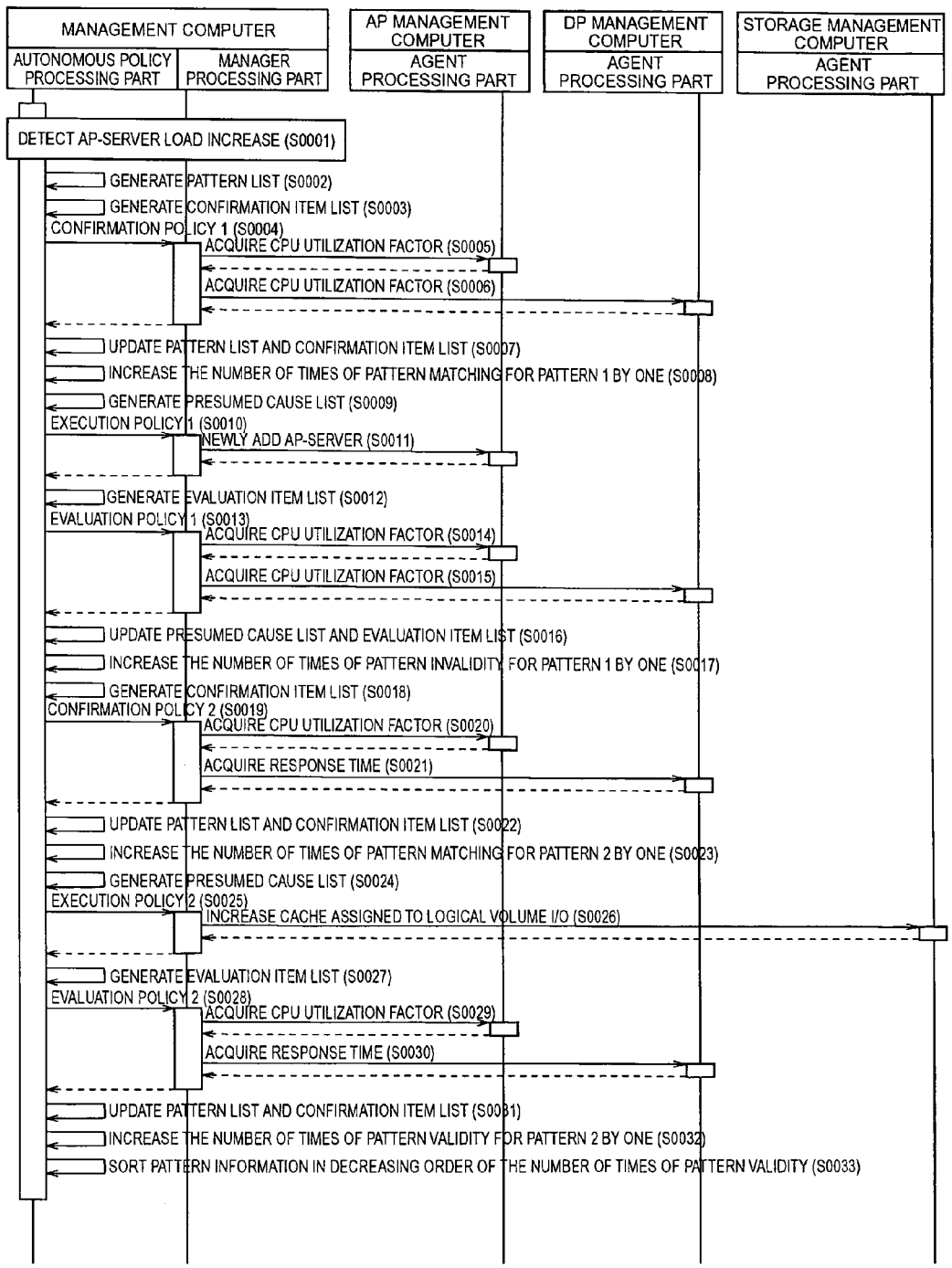
FIG. 23 is a diagram showing a sequence of a process in which an autonomous policy cycle is executed twice to cope with a fault cause when a load increase has occurred in an AP server 1 in the embodiment.

FIG. 23 is a diagram showing a sequence of a process for executing the autonomous policy cycle twice and coping with a fault cause when a load increase has occurred in an AP server 1 in the present embodiment. In the autonomous policy cycle, operation is conducted premised on the system configuration information shown in FIG. 2, the business configuration information 11200 shown in FIG. 3, the pattern information shown in FIG. 5, the confirmation item information shown in FIG. 6, the presumed cause information 11500 shown in FIG. 7, the execution policy information 11600 shown in FIG. 8 and the evaluation item information 11700 shown in FIG. 9.

First, occurrence of a load increase in the AP server 1 is detected (S0001). Subsequently, a pattern list 12300 is generated (S0002). Patterns in the pattern list 12300 are sorted in the decreasing order of the number of times of pattern validity in the pattern information 11300 shown in FIG. 5. Therefore, a pattern 1 which is 2 in number of times of pattern validity 11304, a pattern 2 which is 1 in number of times of pattern validity 11304, a pattern 3 which is 0 in number of times of pattern validity 11304, and a pattern 4 which is 0 in number of times of pattern validity 11304 are executed in order.

Subsequently, the confirmation item list 12400 for the pattern 1 is generated (S0003). Then, the manager processing part 10500 is requested to execute a confirmation policy 1 in order to confirm the cause (S0004). A CPU utilization factor of the AP server 1 is acquired from an agent processing part in the AP management computer 6000 (S0005). A CPU utilization factor of the DB is acquired from an agent processing part in the DB management computer 3000 (S0006).

Subsequently, the pattern list 12300 and the confirmation item list 12400 are updated (S0007). The confirmation item list 12400 updated in the processing at S0007 is shown in FIG. 13. In FIG. 13, the CPU utilization factor of the AP server 1 exceeds 90% which is the cause distinguishing threshold 12404, and the CPU utilization factor of the DB is less than 40% which is the cause distinguishing threshold 12404. It is thus indicated that the pattern matches. The number of times of pattern matching 11303 in the pattern information 11300 for the pattern 1 is increased by one (S0008). On the basis of a result of pattern matching that a load is placed on the AP server 1 and no load is placed on the DB, the load increase for the AP server 1 is judged to be a cause, and the presumed cause list 12500 is generated (S0009). The manager processing part 10500 is requested to execute an execution policy 1 (S0010). The agent processing part in the AP management computer 6000 adds an AP server (S0011).

Subsequently, the evaluation item list 12700 is generated (S0012). Then the manager processing part 10500 is requested to execute an evaluation policy 1 in order to confirm the effect of the execution policy 1 (S0013). A CPU utilization factor of the AP server 1 is acquired from the agent processing part in the AP management computer 6000 (S0010). A CPU utilization factor of the DB is acquired from the agent processing part in the DB management computer 3000 (S0015).

Subsequently, the presumed cause list 12500 and the evaluation item list 12700 are updated (S0016). The evaluation item list 12700 updated in the processing at S0016 is shown in FIG. 15. In FIG. 15, the evaluation result of the CPU utilization factor of the AP server 1 is not in the range between 0% of the stable operation lower limit value 12703 and 40% of the stable operation upper limit value 12704. Thus, it is indicated that the AP server addition processing in the execution policy 1 has no effect. In other words, the cause is not the load increase of the AP server. The number of times of pattern invalidity 11305 in the pattern information 11300 for the pattern 1 is increased by one (S0017).

Subsequently, the confirmation item list 12400 for the pattern 2 is generated (S0018). Then, the manager processing part 10500 is requested to execute a confirmation policy 2 in order to confirm the cause (S0019). A CPU utilization factor of the AP server 1 is acquired from the agent processing part in the AP management computer 6000 (S0020). A response time of the DB is acquired from the agent processing part in the DB management computer 3000 (S0021). The response time in the S0021 processing is time required to conduct processing for reading/writing from the DB to the storage.

Subsequently, the pattern list 12300 and the confirmation item list 12400 are updated (S0022). The confirmation item list 12400 updated in the processing at S0022 is shown in FIG. 24.

FIG. 24 is a diagram showing an example of the confirmation item list 12400 updated in the processing at S022 in the present embodiment. In FIG. 24, the CPU utilization factor of the AP server 1 exceeds 80% which is the cause distinguishing threshold 12404, and the response time of the DB exceeds 10 seconds which is the cause distinguishing threshold 12404. It is thus indicated that the pattern matches.

Therefore, the number of times of pattern matching 11303 in the pattern information 11300 for the pattern 2 is increased by one (S0023). On the basis of a result of pattern matching that a load is placed on the AP server 1 and the response time of the DB becomes excessively long, an insufficient cache quantity assigned to the storage logical volume I/O is judged to be the cause, and the presumed cause list 12500 is generated (S0024).

The manager processing part 10500 is requested to execute an execution policy 2 (S0025). The agent processing part in the storage management computer 5000 increases a cache quantity assigned to the logical volume I/O (S0026).

Subsequently, the evaluation item list 12700 is generated (S0027). Then, the manager processing part 10500 is requested to execute an evaluation policy 2 in order to confirm the effect of the execution policy 2 (S0028). The CPU utilization factor of the AP server 1 is acquired from the agent processing part in the AP management computer 6000 (S0029). The response time is acquired from the agent processing part in the DB management computer 3000 (S0030).

Subsequently, the presumed cause list 12500 and the evaluation item list 12700 are updated (S0031). The evaluation item list 12700 updated in the processing at S0031 is shown in FIG. 25.

FIG. 25 is a diagram showing an example of the evaluation item list 12700 updated in the processing at S0031 in the present embodiment. In FIG. 25, the evaluation result of the CPU utilization factor of the AP server 1 is in the range between 0% of the stable operation lower limit value 12703 and 40% of the stable operation upper limit value 12704. The evaluation result of the response time of the DB is also in the range between 0 second of the stable operation lower limit value 12703 and 1 second of the stable operation upper limit value 12704. Thus, it is indicated that the increase of the cache quantity assigned to the logical volume I/O according to the execution policy 2 is effective. And it is indicated that the cause is the insufficient cache quantity assigned to the storage logical volume I/O.

Therefore, the number of times of pattern validity 11304 in the pattern information 11300 for the pattern 2 is increased by one (S0032). Sorting is conducted in the decreasing order of the number of times of pattern validity 11304 in the pattern information 11300, and the processing is completed (S0033). FIG. 26 shows the pattern information 11300 obtained after completion of the autonomous policy cycle processing shown in FIG. 23.

FIG. 26 is a diagram showing an example of the pattern information 11300 obtained after the completion of the autonomous policy cycle processing in the present embodiment. As compared with FIG. 5 showing the pattern information 11300 obtained before the autonomous policy cycle processing, the execution order is interchanged between the pattern 1 and the pattern 2. At the time of next execution of the autonomous policy processing, the pattern 2 is first executed preferentially. Patterns can be confirmed in the decreasing order of the probability of the pattern validity by conducting sorting in the decreasing order of the number of times of pattern validity 11304. Even if the occurrence place of a fault or overload is the same and a plurality of fault cause places are present, it can be coped with by executing the autonomous policy cycles a plurality of times as shown in FIG. 23.

Figure 27:
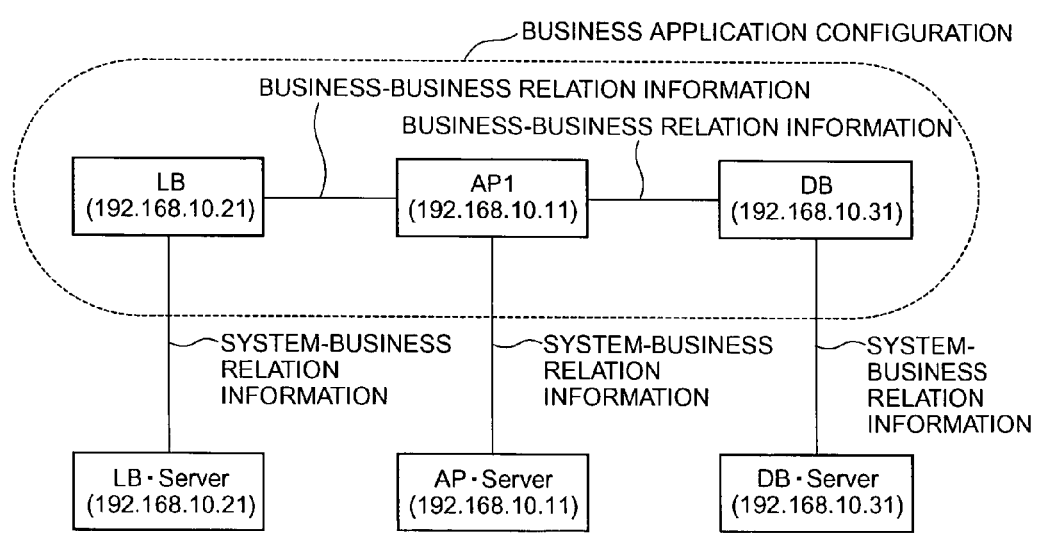
FIG. 27 is a diagram showing an example of relations in system—business relation information in the embodiment.

FIG. 27 is a diagram showing an example of relations in the system-business relation information in the present embodiment. FIG. 27 is a diagram showing an example of relations in business-business relation information represented by the business relation information 11210 and system-business relation information set in the processing conducted in the manager processing part 10500 at the step 10505.

According to the policy control apparatus in the present embodiment, policy processes for acquiring a presumed cause using patterns of confirmation item values of confirmation subject objects, executing a measure and judging an effect are executed in order when a fault has occurred, as heretofore described. Even if business applications and fault causes increase, therefore, it is possible to take a measure against a fault more efficiently without conducting event registration or event content analysis by taking business application as the unit.

The present invention makes it possible to take a measure against a fault more efficiently without conducting event registration or event content analysis by taking business application as the unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition, and judging whether a probability of the presumed cause is greater than a probability of a cause for automatic execution;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus; and controlling an autonomous policy cycle for causing the processing apparatus to conduct the confirmation policy processing, the execution policy processing and the evaluation policy processing in order.

2. The policy control method according to claim 1, wherein the confirmation item information, the presumed cause information, the execution policy information and the evaluation item information are stored in a management database area in the storage apparatus, and managed.

3. The policy control method according to claim 2, wherein, if the measure is judged to be effective, then the number of times of pattern validity in the confirmation item information is stored in the management database area, the confirmation item information is acquired from the storage apparatus in a decreasing order of the number of times of pattern validity, and the confirmation policy processing is conducted.

4. The policy control method according to claim 3, wherein operation know-how is accumulated by storing information according to know-how for a fault place in the confirmation item information, the presumed cause information, the execution policy information and the evaluation item information in the management database area.

5. The policy control method according to claim 2, wherein, if the confirmation item value does not satisfy the condition, then the number of times of pattern non-matching in the confirmation item information is stored in the management database area, and insufficiency of pattern kinds in the confirmation item information is output to an output apparatus to give warning.

6. The policy control method according to claim 2, wherein operation know-how is accumulated by storing information according to know-how for a fault place in the confirmation item information, the presumed cause information, the execution policy information and the evaluation item information in the management database area.

7. The policy control method according to claim 2, wherein:

system configuration information indicating a computer configuration in a system is read out from the storage apparatus, and an address of a computer that has issued a fault event or a load increase event is extracted, business configuration information indicating a business configuration in the system is read out from the storage apparatus, and a business application classification and a business object corresponding to the extracted address are extracted, and the autonomous policy cycle is conducted on the business object of the extracted business application classification.

8. The policy control method according to claim 1, wherein, if the measure is judged to be effective, then the number of times of pattern validity in the confirmation item information is stored in a management database area, the confirmation item information is acquired from the storage apparatus in a decreasing order of the number of times of pattern validity, and the confirmation policy processing is conducted.

9. The policy control method according to claim 8, wherein, if the confirmation item value does not satisfy the condition, then the number of times of pattern non-matching in the confirmation item information is stored in the management database area, and insufficiency of pattern kinds in the confirmation item information is output to an output apparatus to give warning.

10. The policy control method according to claim 8, wherein operation know-how is accumulated by storing information according to know-how for a fault place in the confirmation item information, the presumed cause information, the execution policy information and the evaluation item information in the management database area.

11. The policy control method according to claim 8, wherein:

system configuration information indicating a computer configuration in a system is read out from the storage apparatus, and an address of a computer that has issued a fault event or a load increase event is extracted, business configuration information indicating a business configuration in the system is read out from the storage apparatus, and a business application classification and a business object corresponding to the extracted address are extracted, and the autonomous policy cycle is conducted on the business object of the extracted business application classification.

12. The policy control method according to claim 1, wherein, if the confirmation item value does not satisfy the condition, then the number of times of pattern non-matching in the confirmation item information is stored in the management database area, and insufficiency of pattern kinds in the confirmation item information is output to an output apparatus to give warning.

13. The policy control method according to claim 12, wherein:
   system configuration information indicating a computer configuration in a system is read out from the storage apparatus, and an address of a computer that has issued a fault event or a load increase event is extracted,
   business configuration information indicating a business configuration in the system is read out from the storage apparatus, and a business application classification and a business object corresponding to the extracted address are extracted, and
   the autonomous policy cycle is conducted on the business object of the extracted business application classification.

14. The policy control method according to claim 1, wherein operation know-how is accumulated by storing information according to know-how for a fault place in the confirmation item information, the presumed cause information, the execution policy information and the evaluation item information in a management database area.

15. The policy control method according to claim 14, wherein:
   system configuration information indicating a computer configuration in a system is read out from the storage apparatus, and an address of a computer that has issued a fault event or a load increase event is extracted,
   business configuration information indicating a business configuration in the system is read out from the storage apparatus, and a business application classification and a business object corresponding to the extracted address are extracted, and
   the autonomous policy cycle is conducted on the business object of the extracted business application classification.

16. The policy control method according to claim 14, wherein configuration information of each computer is acquired from an agent processing part of the computer in the system to generate the system configuration information.

17. The policy control method according to claim 1, wherein:
   system configuration information indicating a computer configuration in a system is read out from the storage apparatus, and an address of a computer that has issued a fault event or a load increase event is extracted,
   business configuration information indicating a business configuration in the system is read out from the storage apparatus, and a business application classification and a business object corresponding to the extracted address are extracted, and
   the autonomous policy cycle is conducted on the business object of the extracted business application classification.

18. The policy control method according to claim 17, wherein business information of each computer is acquired from an agent processing part of the computer in the system to generate the business configuration information.

19. The policy control method according to claim 1, wherein reliability of the cause is altered according to whether the evaluation item value lies between an upper limit and a lower limit of stable operation or not.

20. A policy control apparatus responsive to occurrence of a fault or abnormality in a computer to distinguish a fault occurrence place and a cause and take a measure by using policies, the policy control apparatus comprising:

a confirmation policy processing part used to conduct confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition, and judging whether a probability of the presumed cause is greater than a probability of a cause for automatic execution;
   an execution policy processing part used to conduct execution policy processing for causing a processing apparatus to execute contents of a measure read out from execution policy information, the execution policy information indicating a measure against the acquired presumed cause;
   an evaluation policy processing part used to conduct evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus; and
   an autonomous policy processing part used to control an autonomous policy cycle for causing the processing apparatus to conduct the confirmation policy processing, the execution policy processing and the evaluation policy processing in order.

21. A computer readable storage medium embodying program carried out by a computer to execute a policy control method responsive to occurrence of a fault or abnormality in a computer to distinguish a fault occurrence place and a cause and take a measure by using policies, the policy control method comprising:
   conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition, and judging whether a probability of the presumed cause is greater than a probability of a cause for automatic execution;
   conducting execution policy processing for causing a processing apparatus to execute contents of a measure read out from execution policy information, the execution policy information indicating a measure against the acquired presumed cause;
   conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus; and controlling an autonomous policy cycle for causing the processing apparatus to conduct the confirmation policy processing, the execution policy processing and the evaluation policy processing in order.

22. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus;

controlling an autonomous policy cycle for causing the processing apparatus to conduct the confirmation policy processing, the execution policy processing and the evaluation policy processing in order; and wherein:

system configuration information indicating a computer configuration in a system is read out from the storage apparatus, and an address of a computer that has issued a fault event or a load increase event is extracted, business configuration information indicating a business configuration in the system is read out from the storage apparatus, and a business application classification and a business object corresponding to the extracted address are extracted, and the autonomous policy cycle is conducted on the business object of the extracted business application classification.

23. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus;

controlling an autonomous policy cycle for causing the processing apparatus to conduct the confirmation policy processing, the execution policy processing and the evaluation policy processing in order;

wherein the confirmation item information, the presumed cause information, the execution policy information and the evaluation item information are stored in a management database area in the storage apparatus, and managed;

system configuration information indicating a computer configuration in a system is read out from the storage apparatus, and an address of a computer that has issued a fault event or a load increase event is extracted;

business configuration information indicating a business configuration in the system is read out from the storage apparatus, and a business application classification and a business object corresponding to the extracted address are extracted; and the autonomous policy cycle is conducted on the business object of the extracted business application classification.

24. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus;

controlling an autonomous policy cycle for causing the processing apparatus to conduct the confirmation policy processing, the execution policy processing and the evaluation policy processing in order;

wherein, if the measure is judged to be effective, then the number of times of pattern validity in the confirmation item information is stored in a management database area, the confirmation item information is acquired from the storage apparatus in a decreasing order of the number of times of pattern validity, and the confirmation policy processing is conducted; and system configuration information indicating a computer configuration in a system is read out from the storage apparatus, and an address of a computer that has issued a fault event or a load increase event is extracted;

business configuration information indicating a business configuration in the system is read out from the storage apparatus, and a business application classification and a business object corresponding to the extracted address are extracted; and the autonomous policy cycle is conducted on the business object of the extracted business application classification.

25. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus;

controlling an autonomous policy cycle for causing the processing apparatus to conduct the confirmation policy processing, the execution policy processing and the evaluation policy processing in order;

wherein, if the confirmation item value does not satisfy the condition, then the number of times of pattern non-matching in the confirmation item information is stored in the management database area, and insufficiency of pattern kinds in the confirmation item information is output to an output apparatus to give warning; and system configuration information indicating a computer configuration in a system is read out from the storage apparatus, and an address of a computer that has issued a fault event or a load increase event is extracted;

business configuration information indicating a business configuration in the system is read out from the storage apparatus, and a business application classification and a business object corresponding to the extracted address are extracted; and the autonomous policy cycle is conducted on the business object of the extracted business application classification.

26. A policy control method responsive to occurrence of a fault or abnormality in a computer to distinguish a fault occurrence place and a cause and take a measure by using policies, the policy control method comprising:

conducting confirmation policy processing for acquiring confirmation item information from a storage apparatus, the confirmation item information indicating a condition every confirmation item to distinguish a cause at time of fault occurrence, reading out presumed cause information from the storage apparatus when a confirmation item value of a confirmation subject object satisfies a condition in the confirmation item information, the presumed cause information indicating a presumed cause corresponding to each pattern in the confirmation item information, and acquiring a presumed cause corresponding to the confirmation item information of the condition;

conducting execution policy processing for causing a processing apparatus to execute contents of a measure read out from execution policy information, the execution policy information indicating a measure against the acquired presumed cause;

conducting evaluation policy processing for acquiring evaluation item information from the storage apparatus to evaluate a result of the measure, judging an effect of the executed measure on the basis of whether an evaluation item value of an evaluation subject object is in a stable operation range indicated by the evaluation item information, and storing a result of the judging in the storage apparatus;

controlling an autonomous policy cycle for causing the processing apparatus to conduct the confirmation policy processing, the execution policy processing and the evaluation policy processing in order;

wherein operation know-how is accumulated by storing information according to know-how for a fault place in the confirmation item information, the presumed cause information, the execution policy information and the evaluation item information in a management database area; and system configuration information indicating a computer configuration in a system is read out from the storage apparatus, and an address of a computer that has issued a fault event or a load increase event is extracted;

business configuration information indicating a business configuration in the system is read out from the storage apparatus, and a business application classification and a business object corresponding to the extracted address are extracted; and the autonomous policy cycle is conducted on the business object of the extracted business application classification.

* * * * *